United States Patent
Lim et al.

(10) Patent No.: US 12,231,275 B2
(45) Date of Patent: Feb. 18, 2025

(54) TECHNIQUE FOR TRANSMITTING INFORMATION RELATED TO PACKET EXTENSION FIELD IN WIRELESS COMMUNICATION SYSTEM

(71) Applicant: LG ELECTRONICS INC., Seoul (KR)

(72) Inventors: Dongguk Lim, Seoul (KR); Jinsoo Choi, Seoul (KR); Eunsung Park, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 17/764,253

(22) PCT Filed: Oct. 5, 2020

(86) PCT No.: PCT/KR2020/013440
§ 371 (c)(1),
(2) Date: Mar. 28, 2022

(87) PCT Pub. No.: WO2021/066591
PCT Pub. Date: Apr. 8, 2021

(65) Prior Publication Data
US 2022/0345343 A1 Oct. 27, 2022

(30) Foreign Application Priority Data

Oct. 14, 2019 (KR) .................. 10-2019-0127234

(51) Int. Cl.
*H04L 27/26* (2006.01)
*H04L 5/00* (2006.01)
(Continued)

(52) U.S. Cl.
CPC ........ *H04L 27/2605* (2013.01); *H04L 5/0048* (2013.01); *H04W 4/40* (2018.02); *H04W 84/12* (2013.01)

(58) Field of Classification Search
CPC ............... H04L 27/2605; H04L 5/0048; H04L 5/0044; H04L 27/2607; H04W 84/12
See application file for complete search history.

(56) References Cited

U.S. PATENT DOCUMENTS

| 8,462,863 | B1 | 6/2013 | Zhang et al. |
| 11,032,118 | B2 * | 6/2021 | Cao .................. H04L 5/0094 |
| 2013/0128806 | A1 | 5/2013 | Vermani et al. |
| 2013/0230120 | A1 | 9/2013 | Yang et al. |

(Continued)

FOREIGN PATENT DOCUMENTS

| EP | 3657720 A1 | 5/2020 |
| WO | 2016140402 | 9/2016 |

(Continued)

OTHER PUBLICATIONS

Lim, Dongguk et al., PHY designs for 11bd, IEEE 802.11 Documents, IEEE 802.11-19/332r2, Mar. 14, 2019, see slides 8 and 12.

(Continued)

*Primary Examiner* — Shukri Taha
(74) *Attorney, Agent, or Firm* — BRYAN CAVE LEIGHTON PAISNER LLP

(57) ABSTRACT

One embodiment according to the present specification relates to a technique for transmitting information related to a packet extension field in a wireless LAN (WLAN) system. An NGV PPDU can include at least one midamble and a packet extension field set on the basis of the at least one midamble. For example, a duration related to the packet extension field can be set on the basis of the number of the at least one midamble. A preamble of the NGV PPDU can include information related to a packet extension field.

9 Claims, 33 Drawing Sheets

(51) Int. Cl.
    *H04W 4/40*       (2018.01)
    *H04W 84/12*     (2009.01)

(56) References Cited

U.S. PATENT DOCUMENTS

| | | |
|---|---|---|
| 2018/0048503 A1 | 2/2018 | Kim et al. |
| 2018/0359066 A1* | 12/2018 | Mu ................... H04L 27/2692 |
| 2019/0097857 A1 | 3/2019 | Zhang et al. |
| 2019/0173710 A1 | 6/2019 | Cao et al. |
| 2019/0261352 A1 | 8/2019 | Cariou et al. |
| 2019/0268739 A1 | 8/2019 | Cariou et al. |
| 2019/0297146 A1 | 9/2019 | Noh et al. |
| 2020/0008201 A1* | 1/2020 | Kenney ................ H04W 4/48 |
| 2020/0204417 A1* | 6/2020 | Yu ..................... H04L 27/2613 |
| 2021/0076179 A1* | 3/2021 | Cao ................... H04L 27/2605 |
| 2021/0219109 A1* | 7/2021 | Cariou .............. H04L 27/2603 |
| 2021/0336738 A1* | 10/2021 | Nakano .................. H04L 27/26 |

FOREIGN PATENT DOCUMENTS

| | | |
|---|---|---|
| WO | 2017036257 | 3/2017 |
| WO | 2018218220 A1 | 11/2018 |
| WO | 2019042210 A1 | 3/2019 |
| WO | 2019060407 | 3/2019 |

OTHER PUBLICATIONS

Cao, Rui et al., NGV frame format discussions, IEEE 802.11-19/107Ir0, Jul. 15, 2019, see slides 3-12.

Lim, Dongguk et al., Frame format for 1 lbd, IEEE 802.11-19/1484r0, Sep. 15, 2019, see slides 2-12.

"Frame Formats", IEEE, vol. 802.11ax/D3.0, Jun. 2018; Retrieved from the Internet: URL:www.ieee802.org/11/private/Draft_Standards/llax/TGax_C1_09.rtf [retrieved on Jun. 1, 2018].

* cited by examiner (a)

| L-STF (2210) | L-LTF (2220) | L-SIG (2230) | RL-SIG (2240) | NGV-SIG (2250) | RNGV-SIG (2260) | NGV-STF (2270) | NGV-LTF (2280) | NGV data (2290) |

2200

10MHz

TECHNIQUE FOR TRANSMITTING INFORMATION RELATED TO PACKET EXTENSION FIELD IN WIRELESS COMMUNICATION SYSTEM

This application is the National Stage filing under 35 U.S.C. 371 of International Application No. PCT/KR2020/013440 filed on Oct. 5, 2020, which claims priority to Korean Patent Application Nos. 10-2019-0120996 filed on Sep. 30, 2019 and 10-2019-0127234 filed on Oct. 14, 2019, the contents of which are all hereby incorporated by reference herein in their entirety.

BACKGROUND

Field of the Disclosure

The present specification relates to a technique for transmitting information related to a packet extension field in a wireless LAN system, and more particularly, to a method for configuring a packet extension field of an NGV PPDU and transmitting duration information of the packet extension field in a wireless LAN system an apparatus supporting the same.

Related Art

Wireless network technologies may include various types of wireless local area networks (WLANs). WLAN employs widely used networking protocols and can be used to interconnect nearby devices together. The various technical features described in the present specification can be applied to any communication standard, such as WiFi or, more generally, any one of the IEEE 802.11 radio protocol family.

The present specification either enhances the conventional (or existing) IEEE 802.11p specification or proposes technical characteristics that can be used in a new communication standard. The new communication standard may be a Next Generation Vehicular/V2x (NGV) standard, which is currently being discussed.

Specifically, the NGV (i.e., 802.11bd standard) standard is being developed to support 2x throughput improvement, coverage extension, and high speed compared to the 802.11p standard system (e.g., DSRC system) in the 5.9 GHz band.

SUMMARY

Technical Objects

In the NGV standard (i.e., 802.11bd standard), wide bandwidth (20 MHz) transmission is being considered instead of the conventional 10 MHz transmission to improve 2x throughput. In addition, the NGV standard should support operations such as interoperability/backward compatibility/coexistence with the existing 802.11p standard.

A signal according to the NGV standard may be transmitted in a high-speed environment. Accordingly, reception performance may be deteriorated due to the influence of Doppler (or Doppler shift). Accordingly, an STA supporting the NGV standard (i.e., an NGV STA) may use a midamble for channel estimation. According to the NGV standard, there is an effect of reducing the effect on Doppler (i.e., performance degradation) through the midamble. In order to reduce performance degradation in such a high-speed environment, the midamble may be transmitted using various configurations and cycles.

A 2x compressed midamble can be used to reduce the overhead of the midamble. If the 2x compressed midamble is used, a method for matching the length of the PPDU with the length field may be required.

Technical Solutions

A transmitting STA according to various embodiments may perform operations comprising: receiving a Next Generation V2x Physical Protocol Data Unit (NGV PPDU), wherein the NGV PPDU includes a preamble, a data field, at least one midamble, and a packet extension field, wherein a duration of the packet extension field is set based on a number of the at least one midamble, wherein the preamble includes 3-bit information related to the packet extension field; and decoding the NGV PPDU based on the preamble and the at least one midamble

Technical Effects of the Disclosure

This specification proposes technical features supporting a situation in which the 5.9 GHz band is used in various WLAN systems (e.g., IEEE 802.11bd systems). Based on various examples of the present specification, throughput improvement and high speed of Dedicated Short Range Communication (DSRC) (802.11p) may be supported for smooth V2x support in the 5.9 GHz band.

According to an example of the present specification, there is an effect of preventing performance degradation due to Doppler movement through the configuration of the midamble in a high speed situation. For example, a 2x compressed midamble may be used as the midamble. If a 2x compressed midamble is used, it has the effect of reducing overhead.

According to an example of the present specification, when a 2x compressed midamble is used, the length of the NGV PPDU may not be set in units of symbols. Accordingly, a packet extension field may be added based on the number of midambles. By adding the packet extension field, there is an effect that the length of the NGV PPDU is set in symbol units (e.g., 8 μs). In addition, since 3-bit information related to the duration of the packet extension field is included in the NGV PPDU, the receiving STA may first check the duration of the packet extension field and decode the NGV PPDU.

BRIEF DESCRIPTION OF THE DRAWINGS

FIG. 22 shows the format of an NGV PPDU.

DETAILED DESCRIPTION

Figure 1:
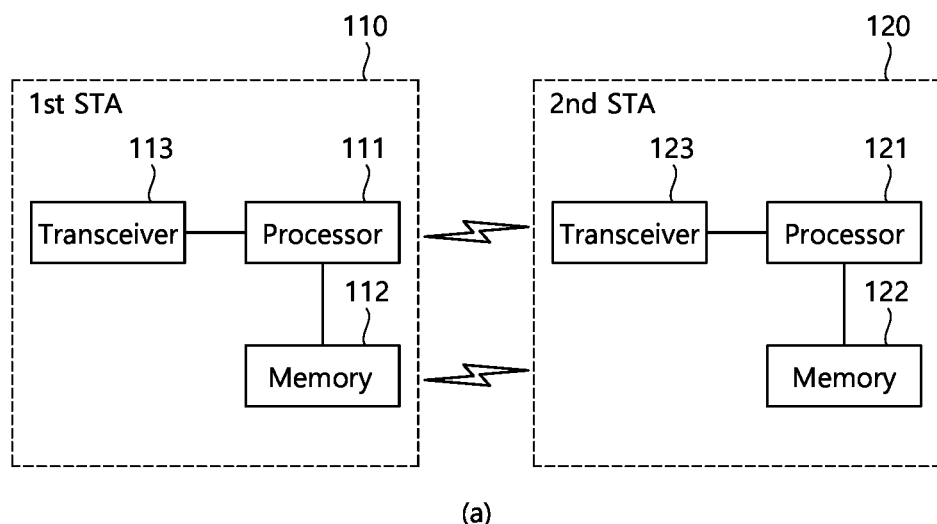
FIG. 1 shows an example of a transmitting apparatus and/or receiving apparatus of the present specification.
Figure 1:
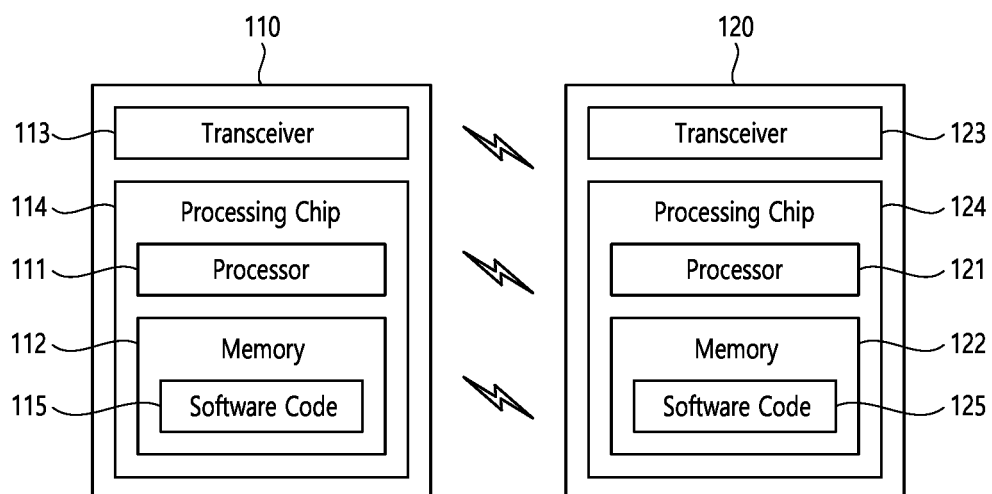

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (Rx) signal, generate a transmission (Tx) signal, and provide control for signal transmission. The memory 112 of the AP may store a signal (e.g., Rx signal) received through the transceiver 113, and may store a signal (e.g., Tx signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an Rx signal, generate a Tx signal, and provide control for signal transmission. A memory 122 of the non-AP STA may store a signal (e.g., Rx signal) received through the transceiver 123, and may store a signal (e.g., Tx signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a Tx/Rx signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a Tx/Rx signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a Tx/Rx signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a Tx/Rx signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a Tx/Rx signal or perform data processing and computation in advance for the Tx/Rx signal may be performed in the processors 111 and 121 of FIG. 1. For example, an example of an operation for generating the Tx/Rx signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a Tx/Rx signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, ExYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
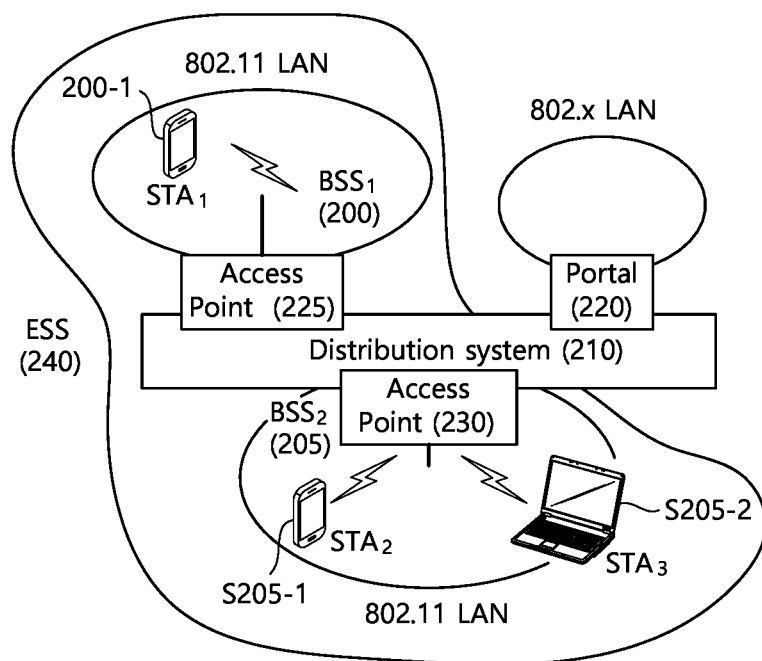
FIG. 2 is a conceptual view illustrating the structure of a wireless local area network (WLAN).
Figure 2:
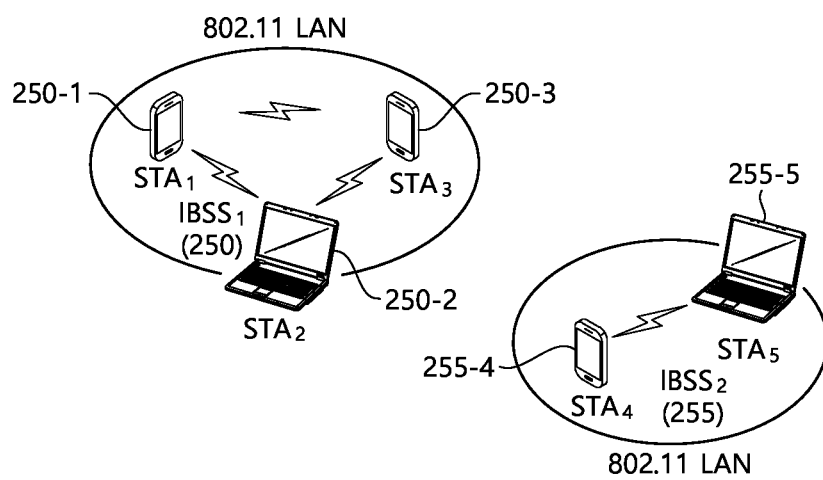

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner In the IBSS, all STAs 250-1, 250-2, 250-3, 255-4, and 255-5 may be constituted by movable STAs and are not permitted to access the DS to constitute a self-contained network.

Figure 3:
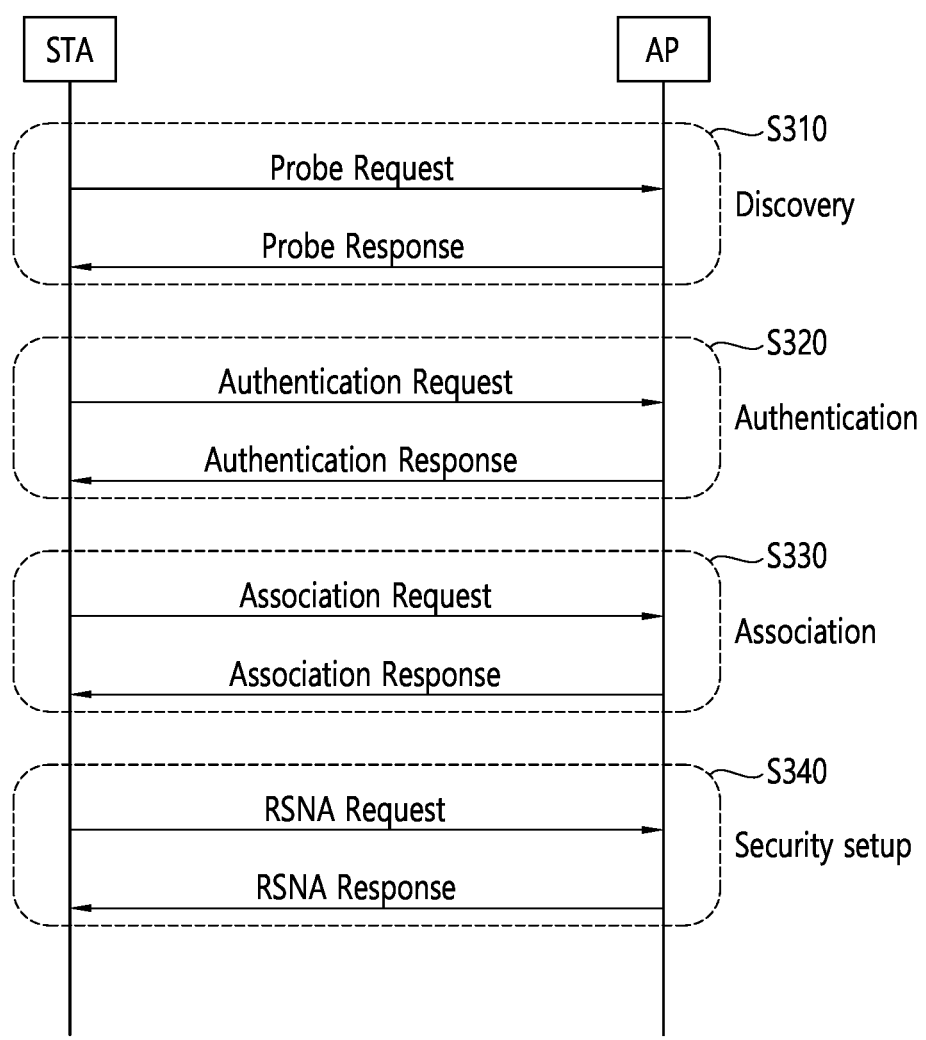
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
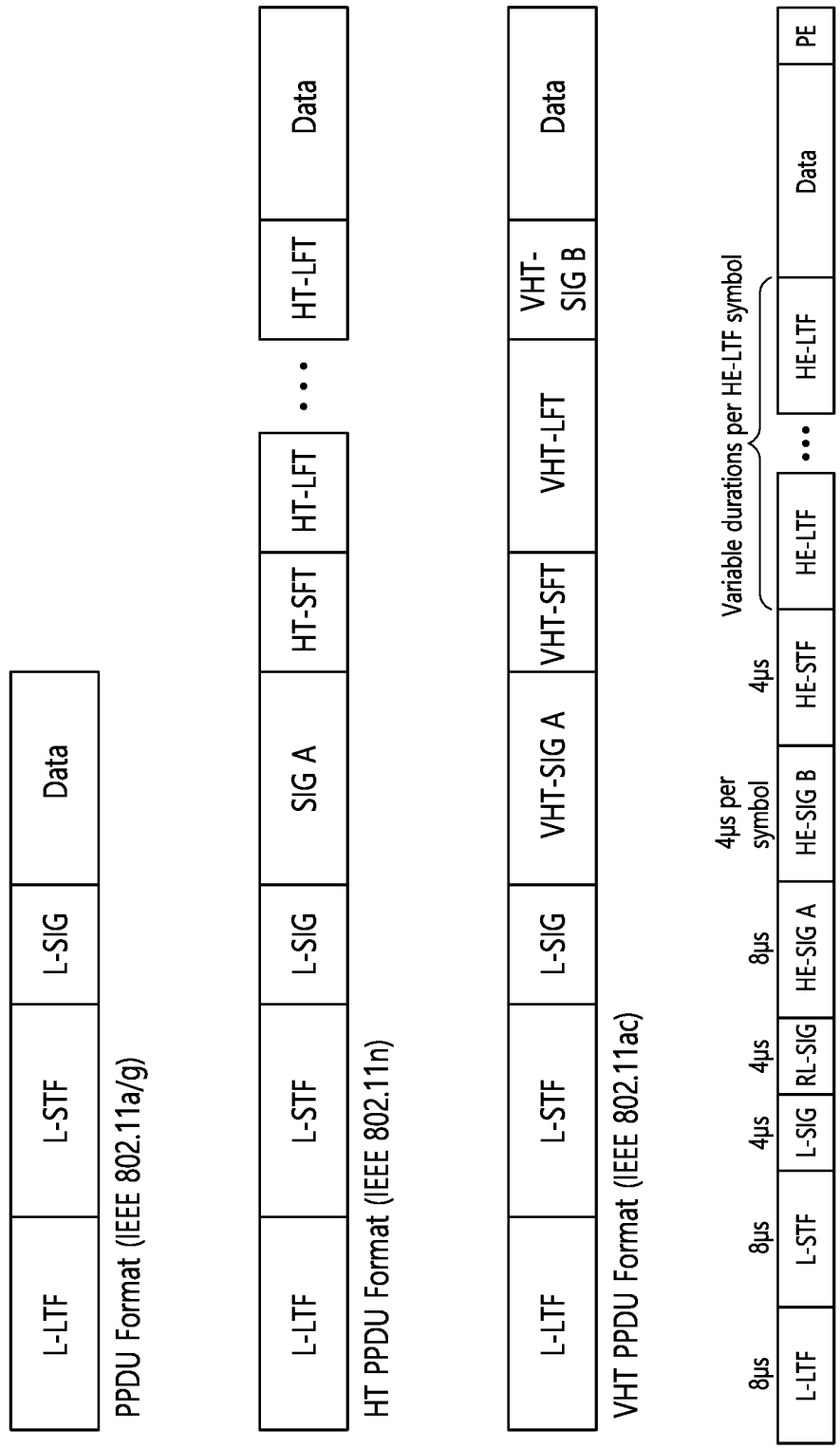
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
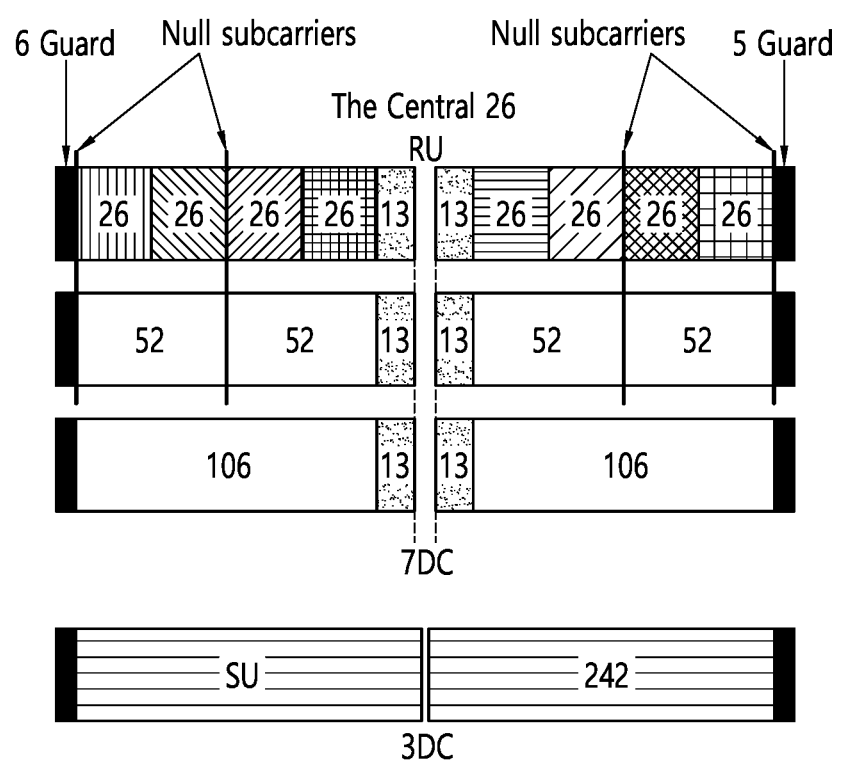
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
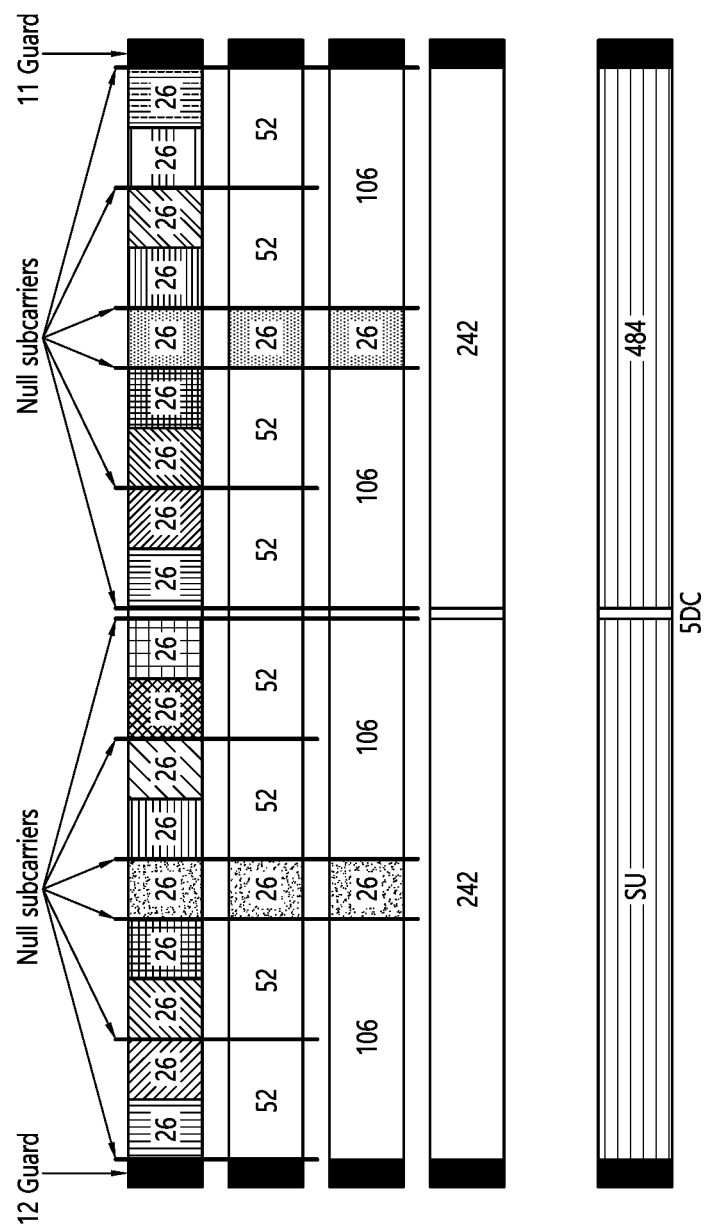
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
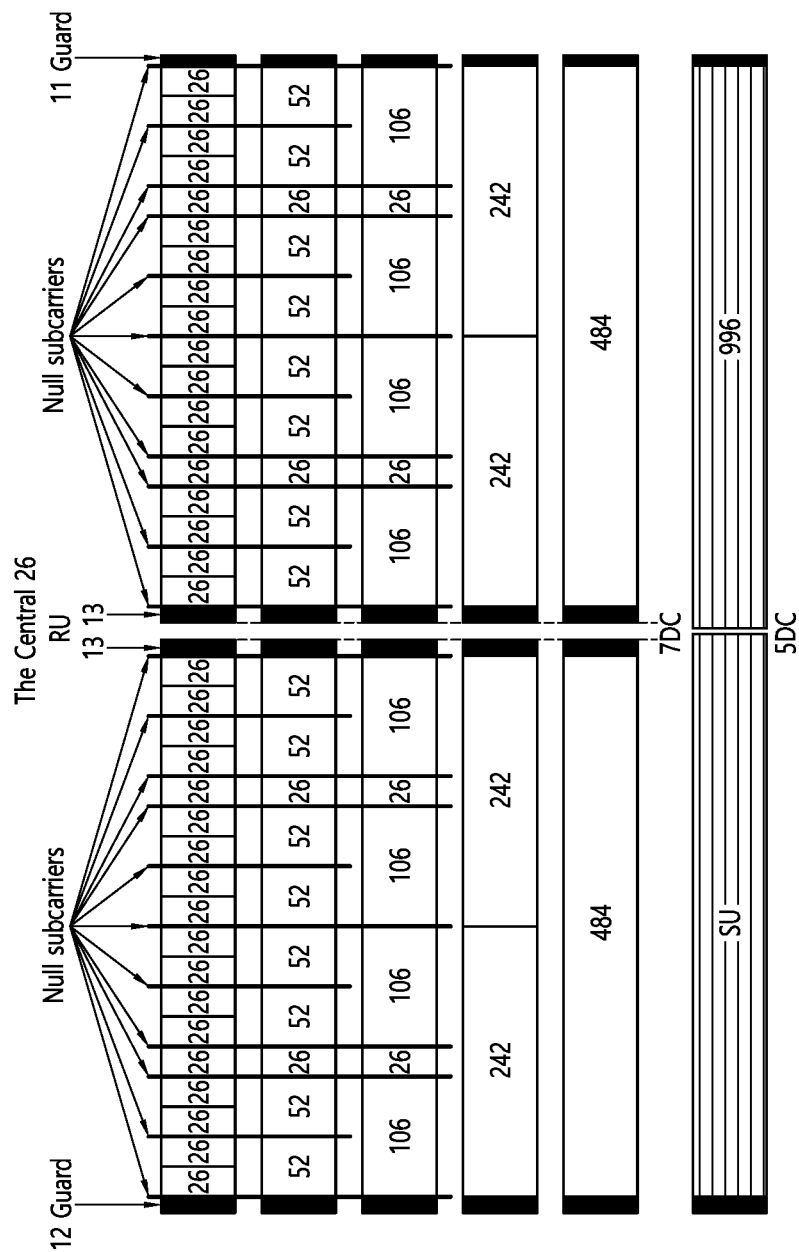
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
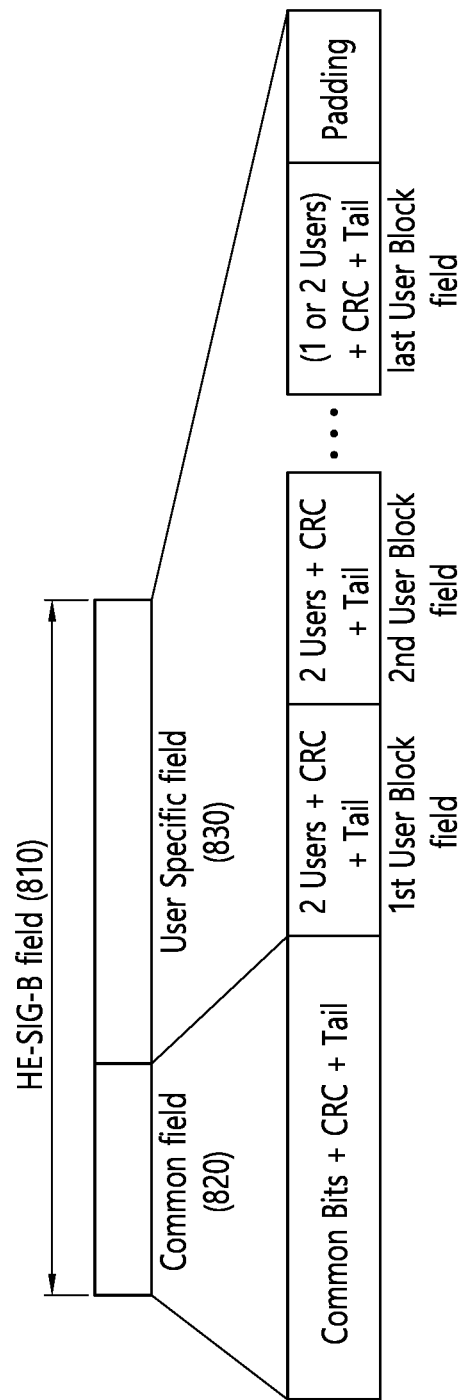
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | | | 26 | 26 | 26 | 26 | 26 | 8 |
| 01001$y_2y_1y_0$ | 106 | | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

Figure 9:
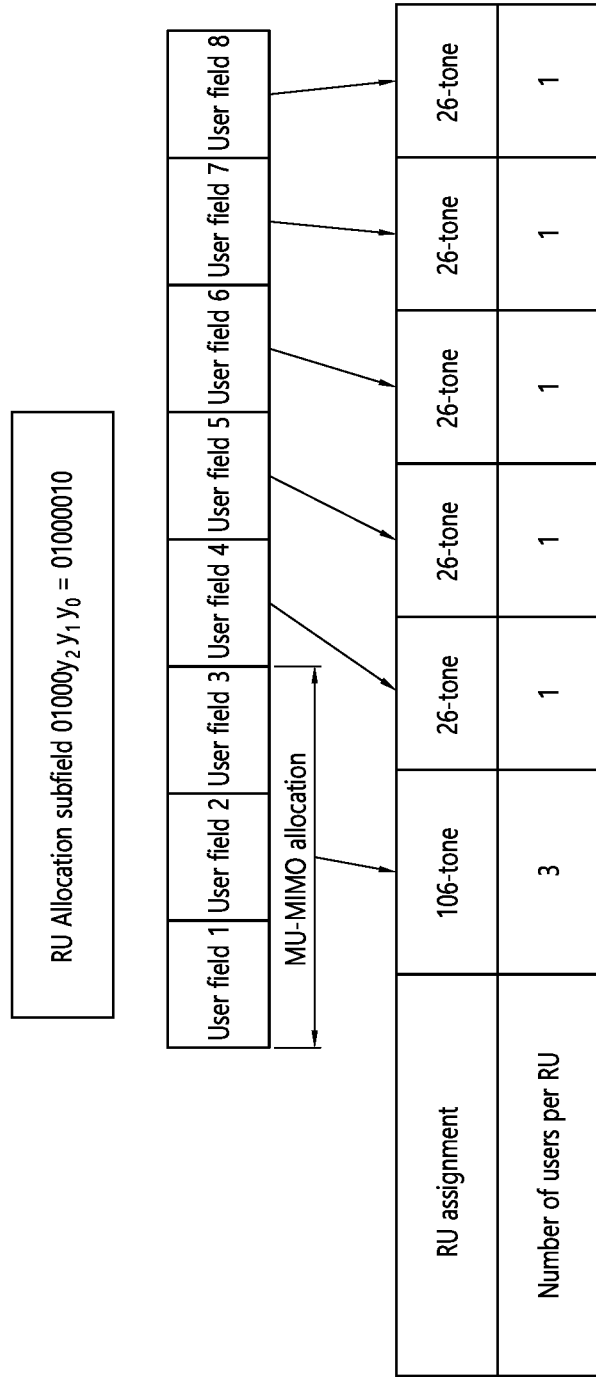
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
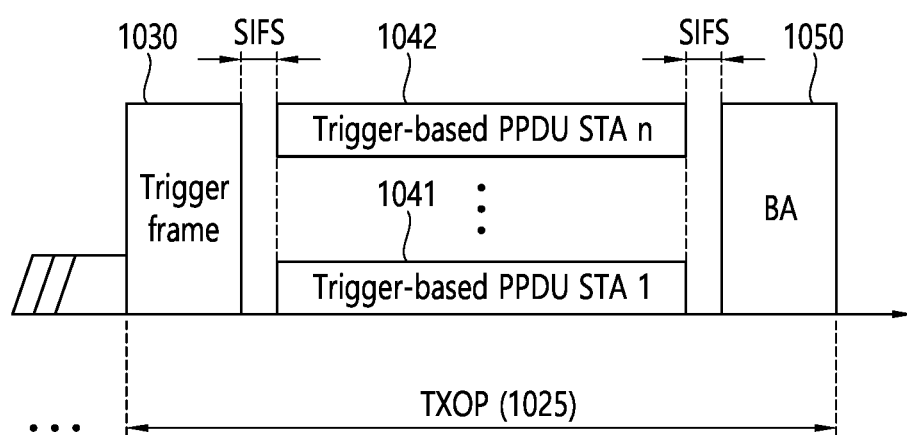
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
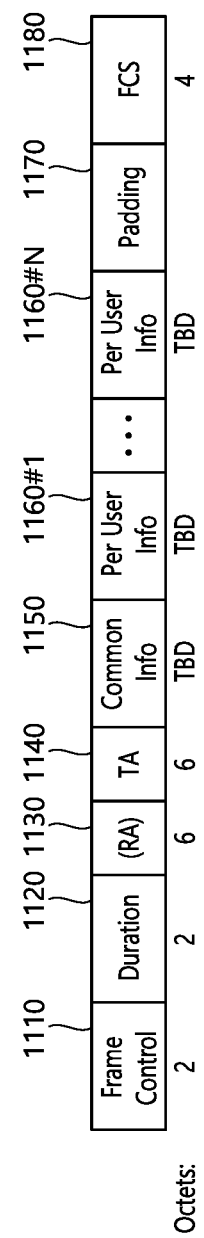
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
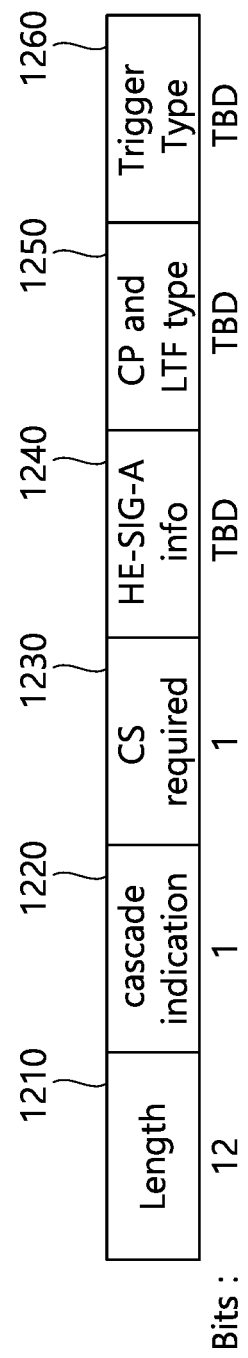
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TxOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
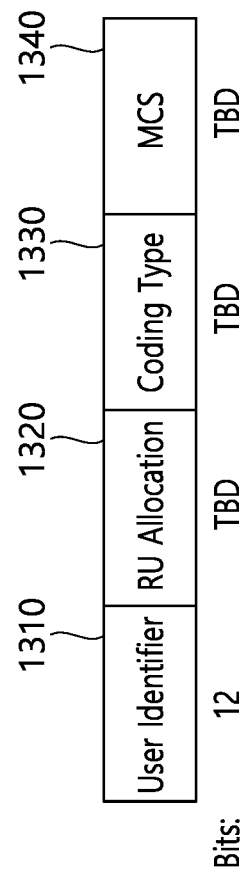
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL 01-DMA-based random access (UORA) scheme will be described.

Figure 14:
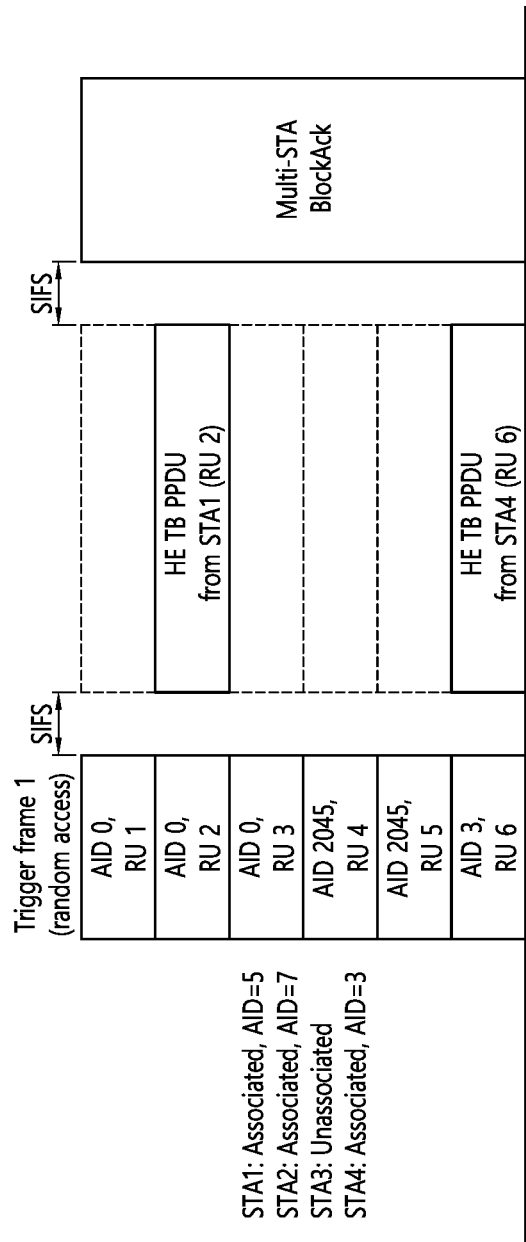
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
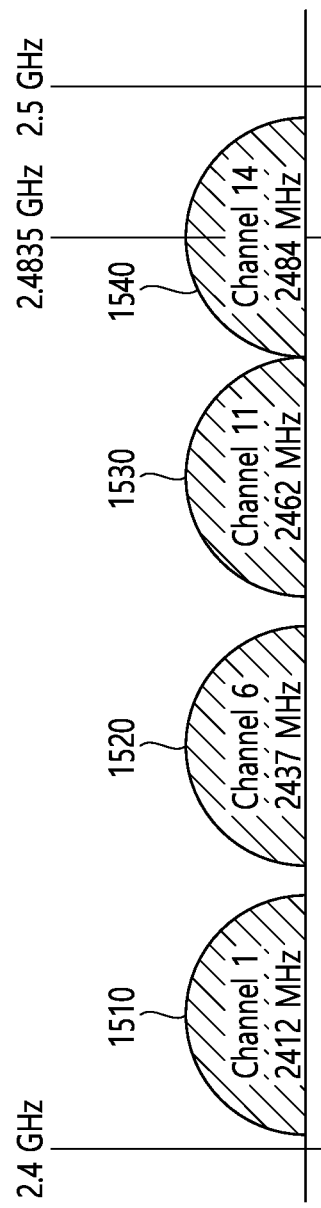
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
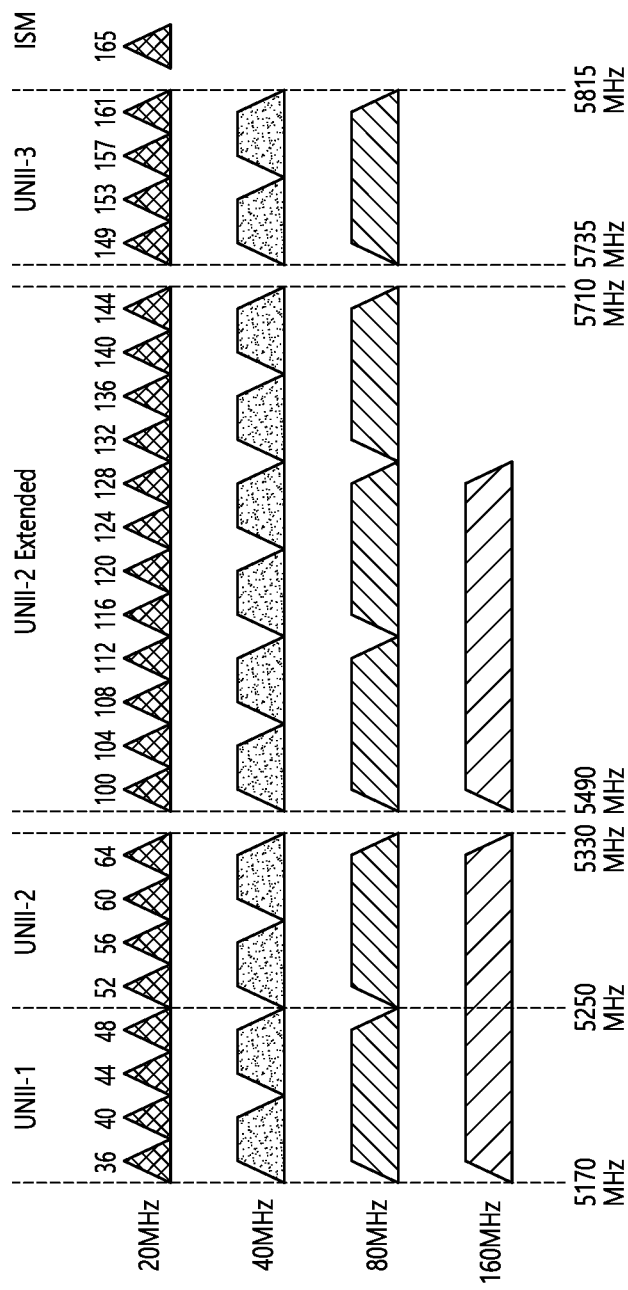
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
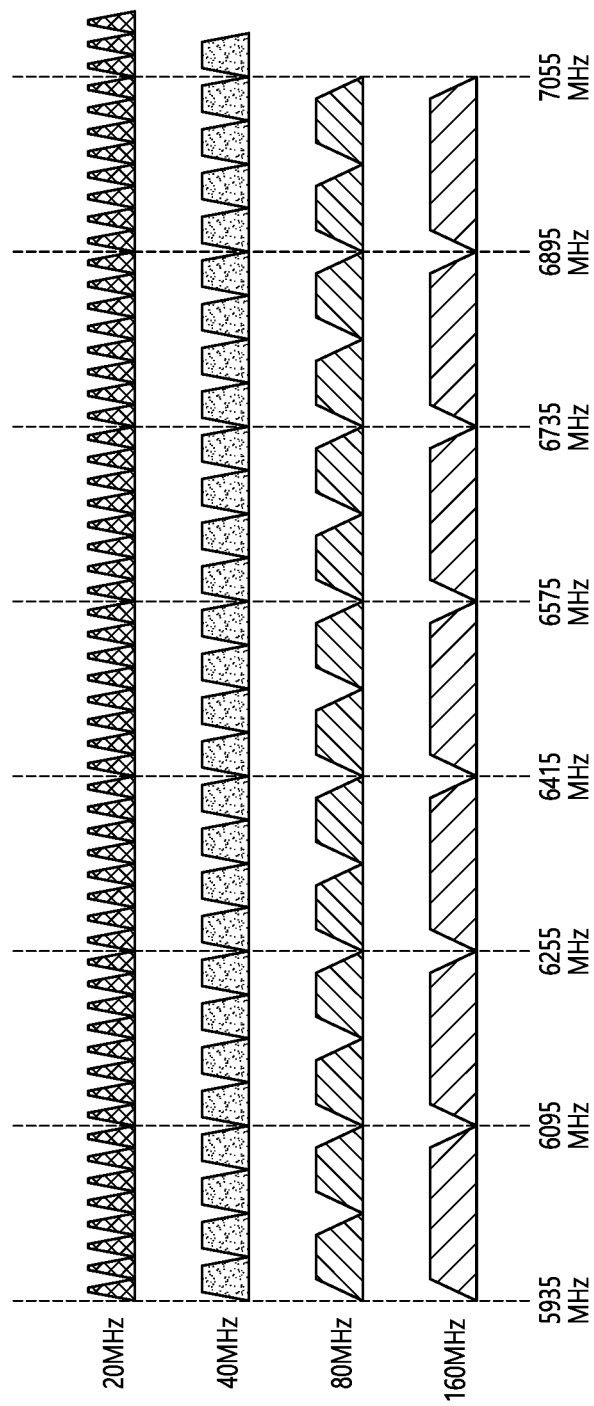
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a Tx PPDU, an Rx PPDU, a first type or N-th type PPDU, or the like. For example, in the present specification, the PPDU or the EHT PPDU may be called in various terms such as a Tx PPDU, a Rx PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, an STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the Rx PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a Tx/Rx PPDU. For example, a first value of the PHY version identifier of 3 bits may indicate that the Tx/Rx PPDU is an EHT PPDU. In other words, when the transmitting STA transmits the EHT PPDU, the PHY version identifier of 3 bits may be set to a first value. In other words, the receiving STA may determine that the Rx PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TxOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 µs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0  | 26 | 26 | 26 | 26 | 26 | 26 | 26 | 26 | 26 | 1 |
| 1  | 26 | 26 | 26 | 26 | 26 | 26 | 26 | 52 |    | 1 |
| 2  | 26 | 26 | 26 | 26 | 26 | 52 |    | 26 | 26 | 1 |
| 3  | 26 | 26 | 26 | 26 | 26 | 52 |    | 52 |    | 1 |
| 4  | 26 | 26 |    | 52 | 26 | 26 | 26 | 26 | 26 | 1 |
| 5  | 26 | 26 |    | 52 | 26 | 26 | 26 | 52 |    | 1 |
| 6  | 26 | 26 |    | 52 | 26 | 52 |    | 26 | 26 | 1 |
| 7  | 26 | 26 |    | 52 | 26 | 52 |    | 52 |    | 1 |
| 8  |    | 52 | 26 | 26 | 26 | 26 | 26 | 26 | 26 | 1 |
| 9  |    | 52 | 26 | 26 | 26 | 26 | 26 | 52 |    | 1 |
| 10 |    | 52 | 26 | 26 | 26 | 52 |    | 26 | 26 | 1 |
| 11 |    | 52 | 26 | 26 | 26 | 52 |    | 52 |    | 1 |
| 12 |    | 52 |    | 52 | 26 | 26 | 26 | 26 | 26 | 1 |
| 13 |    | 52 |    | 52 | 26 | 26 | 26 | 52 |    | 1 |
| 14 |    | 52 |    | 52 | 26 | 52 |    | 26 | 26 | 1 |
| 15 |    | 52 |    | 52 | 26 | 52 |    | 52 |    | 1 |
| 16 | 26 | 26 | 26 | 26 | 26 |    | 106 |   |   | 1 |
| 17 | 26 | 26 |    | 52 | 26 |    | 106 |   |   | 1 |
| 18 |    | 52 | 26 | 26 | 26 |    | 106 |   |   | 1 |
| 19 |    | 52 |    | 52 | 26 |    | 106 |   |   | 1 |

TABLE 6

| Indices | #1 | #2 | #3 | #4 | #5 | #6 | #7 | #8 | #9 | Number of entries |
|---|---|---|---|---|---|---|---|---|---|---|
| 20 |    | 106 |   |    | 26 | 26 | 26 | 26 | 26 | 1 |
| 21 |    | 106 |   |    | 26 | 26 | 26 | 52 |    | 1 |
| 22 |    | 106 |   |    | 26 | 52 |    | 26 | 26 | 1 |
| 23 |    | 106 |   |    | 26 | 52 |    | 52 |    | 1 |
| 24 | 52 |    | 52 |    | — |    | 52 |    | 52 | 1 |
| 25 | 242-tone RU empty (with zero users) | | | | | | | | | 1 |
| 26 |    | 106 |   |    | 26 |    | 106 |   |   | 1 |
| 27-34 |  |    | 242 |   |    |   |    |   |   | 8 |
| 35-42 |  |    | 484 |   |    |   |    |   |   | 8 |
| 43-50 |  |    | 996 |   |    |   |    |   |   | 8 |
| 51-58 |  |    | 2 * 996 |  |  |   |    |   |   | 8 |
| 59 | 26 | 26 | 26 | 26 | 26 |    | 52 + 26 |    | 26 | 1 |
| 60 | 26 |    | 26 + 52 |   | 26 | 26 | 26 | 26 | 26 | 1 |
| 61 | 26 |    | 26 + 52 |   | 26 | 26 | 26 | 52 |    | 1 |
| 62 | 26 |    | 26 + 52 |   | 26 | 52 |    | 26 | 26 | 1 |
| 63 | 26 | 26 |    | 52 | 26 |    | 52 + 26 |    | 26 | 1 |
| 64 | 26 |    | 26 + 52 |   | 26 |    | 52 + 26 |    | 26 | 1 |
| 65 | 26 |    | 26 + 52 |   | 26 |    | 52 |    | 52 | 1 |

TABLE 7

| 66 |    | 52 |    | 26 | 26 | 26 |    | 52 + 26 |    | 26 | 1 |
| 67 |    | 52 |    | 52 |    | 26 |    | 52 + 26 |    | 26 | 1 |
| 68 |    | 52 |    | 52 + 26 |  |   |   | 52 |    | 52 | 1 |
| 69 | 26 | 26 | 26 | 26 |    |    | 26 + 106 |  |  | 1 |
| 70 | 26 |    | 26 + 52 |  | 26 |   | 106 |   |  | 1 |
| 71 | 26 | 26 |    | 52 |   |    | 26 + 106 |  |  | 1 |
| 72 | 26 |    | 26 + 52 |  |   |    | 26 + 106 |  |  | 1 |
| 73 |    | 52 |    | 26 | 26 |    | 26 + 106 |  |  | 1 |
| 74 |    | 52 |    | 52 |   |    | 26 + 106 |  |  | 1 |
| 75 |    | 106 + 26 |  |  |   |    | 26 | 26 | 26 | 1 |
| 76 |    | 106 + 26 |  |  |   |    | 26 | 26 | 52 | 1 |
| 77 |    | 106 + 26 |  |  |   |    | 52 |    | 26 | 1 |
| 78 |    | 106 |   |   | 26 |    | 52 + 26 |   | 26 | 1 |
| 79 |    | 106 + 26 |  |  |   |    | 52 + 26 |   | 26 | 1 |
| 80 |    | 106 + 26 |  |  |   |    | 52 |    | 52 | 1 |
| 81 |    | 106 + 26 |  |  |   |    | 106 |   |   | 1 |
| 82 |    | 106 |   |   |   |    | 26 + 106 |  |  | 1 |

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1x STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2x STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad \text{Equation 1}$$

The EHT-STF for the 20 MHz PPDU may be configured based on the following equation. The following example may be a first type (i.e., 1x STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$EHT\text{-}STF(-112:16:112)=\{M\}*(1+j)/\text{sqrt}(2)$$

$$EHT\text{-}STF(0)=0 \quad \text{<Equation 2>}$$

The EHT-STF for the 40 MHz PPDU may be configured based on the following equation. The following example may be the first type (i.e., 1x STF) sequence.

$$EHT\text{-}STF(-240:16:240)=\{M,0,-M\}*(1+j)/\text{sqrt}(2) \quad \text{<Equation 3>}$$

The EHT-STF for the 80 MHz PPDU may be configured based on the following equation. The following example may be the first type (i.e., 1x STF) sequence.

$$EHT\text{-}STF(-496:16:496)=\{M,1,-M,0,-M,1,-M\}*(1+j)/\text{sqrt}(2) \quad \text{<Equation 4>}$$

The EHT-STF for the 160 MHz PPDU may be configured based on the following equation. The following example may be the first type (i.e., 1x STF) sequence.

$$EHT\text{-}STF(-1008:16:1008)=\{M,1,-M,0,-M,1,-M,0,-M,-1,M,0,-M,1,-M\}*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$EHT\text{-}STF(-496:16:496)=\{-M,-1,M,0,-M,1,-M\}*(1+j)/\text{sqrt}(2) \quad \text{<Equation 6>}$$

Equation 7 to Equation 11 below relate to an example of a second type (i.e., 2x STF) sequence.

$$EHT\text{-}STF(-120:8:120)=\{M,0,-M\}*(1+j)/\text{sqrt}(2) \quad \text{<Equation 7>}$$

The EHT-STF for the 40 MHz PPDU may be configured based on the following equation.

$$EHT\text{-}STF(-248:8:248)=\{M,-1,-M,0,M,-1,M\}*(1+j)/\text{sqrt}(2)$$

$$EHT\text{-}STF(-248)=0$$

$$EHT\text{-}STF(248)=0 \quad \text{<Equation 8>}$$

The EHT-STF for the 80 MHz PPDU may be configured based on the following equation.

$$EHT\text{-}STF(-504:8:504)=\{M,-1,M,-1,-M,-1,M,0,-M,1,M,1,-M,1,-M\}*(1+j)/\text{sqrt}(2) \quad \text{<Equation 9>}$$

The EHT-STF for the 160 MHz PPDU may be configured based on the following equation.

$$EHT\text{-}STF(-1016:16:1016)=\{M,-1,M,-1,-M,-1,M,0,-M,1,M,1,-M,1,-M,0,-M,1,-M,1,M,1,-M,0,-M,1,M,1,-M,1,-M\}*(1+j)/\text{sqrt}(2)$$

$$EHT\text{-}STF(-8)=0, EHT\text{-}STF(8)=0,$$

$$EHT\text{-}STF(-1016)=0, EHT\text{-}STF(1016)=0 \quad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504:8:504)=\{-M,1,-M,1,M,1,-M,0,-M,1,M,1,-M,1,-M\}*(1+j)/\text{sqrt}(2)$$

$$EHT\text{-}STF(-504)=0,$$

$$EHT\text{-}STF(504)=0 \quad \text{<Equation 11>}$$

The EHT-LTF may have first, second, and third types (i.e., 1x, 2x, 4x LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an Rx PPDU as the EHT PPDU, based on the following aspect. For example, the Rx PPDU may be determined as the EHT PPDU: 1) when a first symbol after an L-LTF signal of the Rx PPDU is a BPSK symbol; 2) when RL-SIG in which the L-SIG of the Rx PPDU is repeated is detected; and 3) when a result of applying "modulo 3" to a value of a length field of the L-SIG of the Rx PPDU is detected as "0". When the Rx PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the Rx PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the Rx PPDU as the EHT PPDU, based on the following aspect. For example, the Rx PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the Rx PPDU as a non-HT, HT, and VHT PPDU, based on the following aspect. For example, the Rx PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the Rx PPDU may be determined as the non-HT, HT, and VHT PPDU.

In the following example, a signal represented as a (Tx/Rx/UL/DL) signal, a (Tx/Rx/UL/DL) frame, a (Tx/Rx/UL/DL) packet, a (Tx/Rx/UL/DL) data unit, (Tx/Rx/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frames, the management frame, and the data frame.

Figure 19:
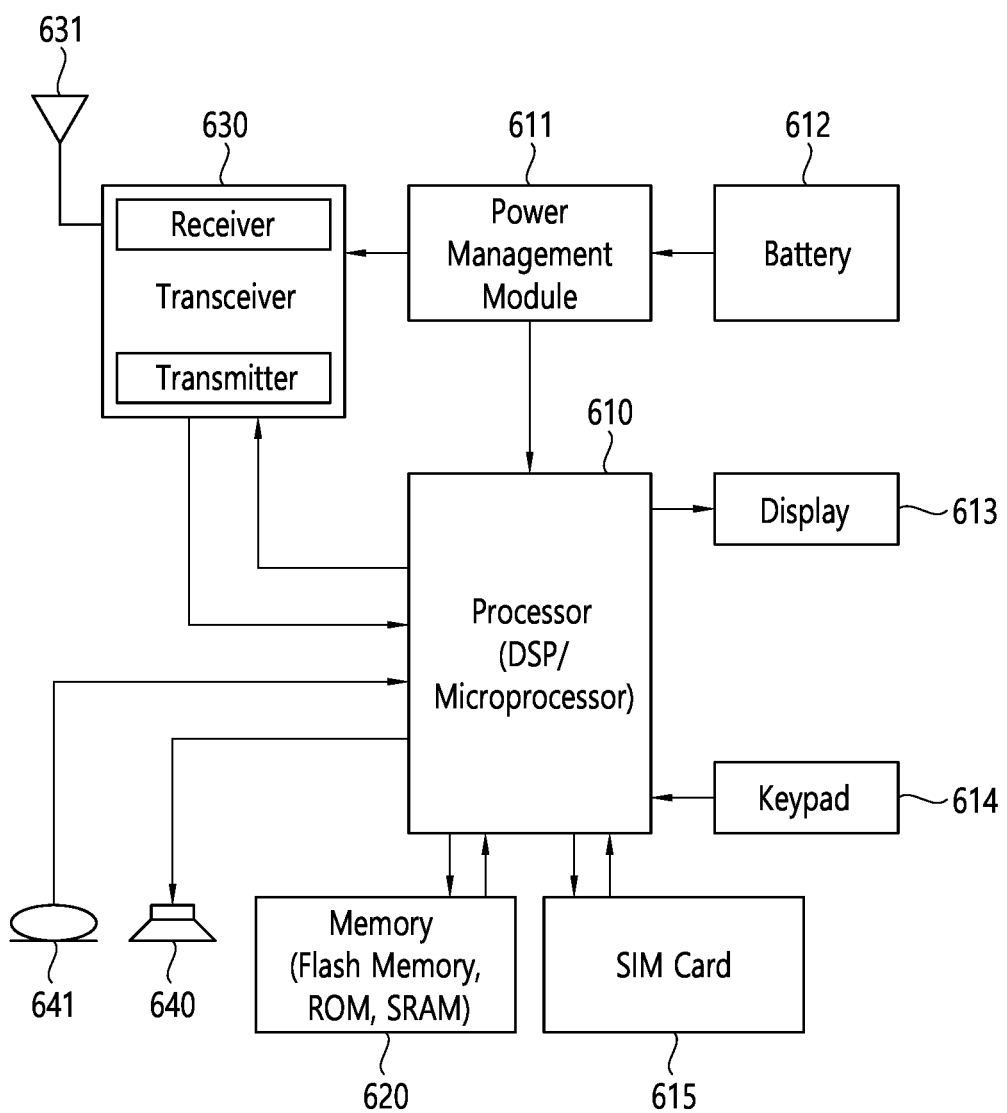
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
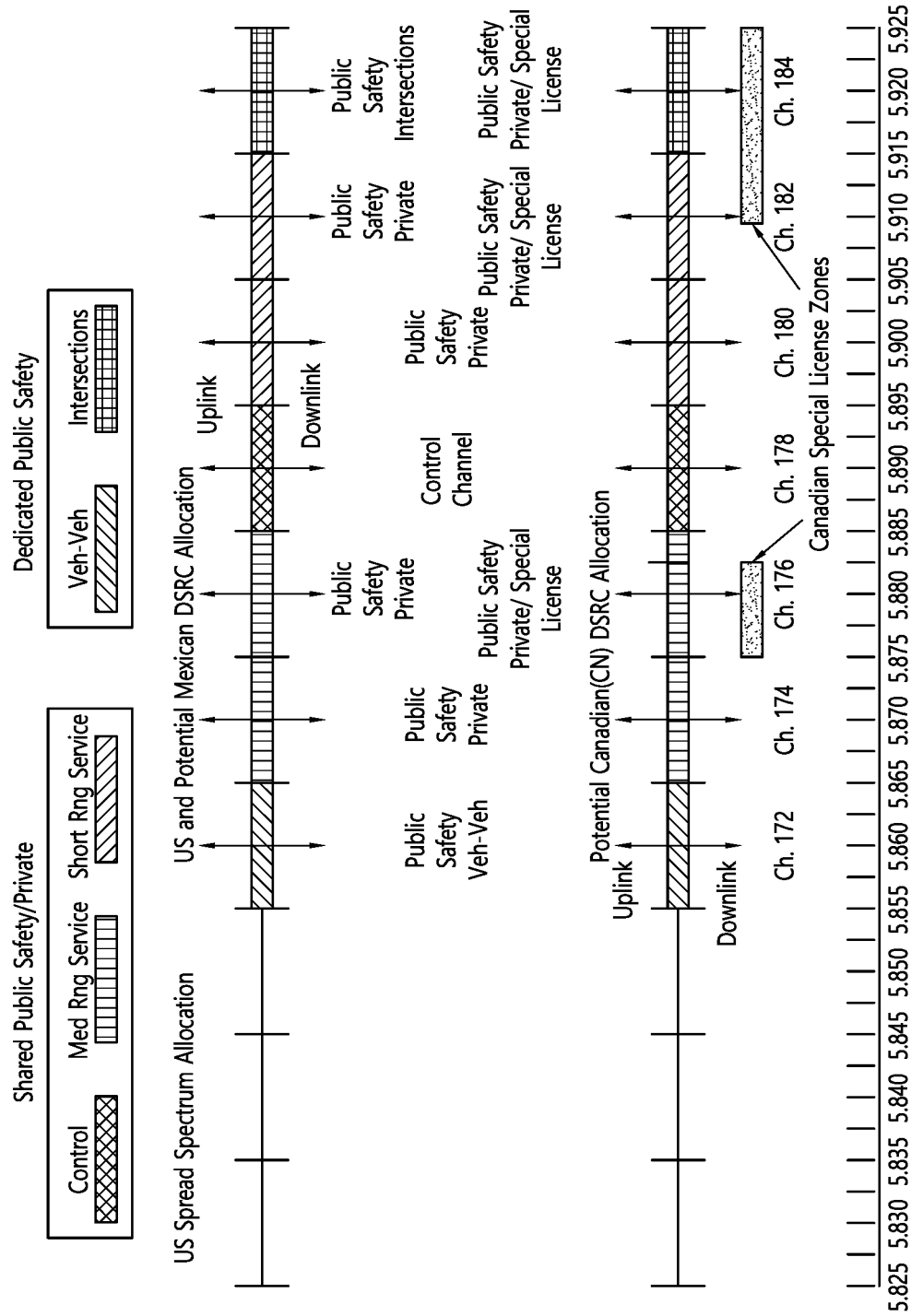
FIG. 20 shows a band plan of 5.9 GHz DSRC.

FIG. 20 shows a band plan of 5.9 GHz DSRC.

5.9 GHz DSRC is a short to medium range communications service that supports both public safety and private operations in roadside-to-vehicle and vehicle-to-vehicle communication environments. DSRC is devised as a complement to cellular communications by providing very high data transfer rates in situations where minimizing latency in the communication link and isolating relatively small communication zones are important. Additionally, PHY and MAC protocols are based on the revision of IEEE 802.11p for wireless access in a vehicular environment (WAVE).

<IEEE 802.11p>

802.11p uses a PHY of 802.11a by performing 2x down-clocking on the PHY. That is, 802.11p transmits a signal by using a 10 MHz bandwidth and not a 20 MHz bandwidth. The numerology comparing 802.11a to 802.11p is as follows.

TABLE 8

|  | IEEE 802.11a | IEEE 802.11p |
| --- | --- | --- |
| Symbol duration | 4 us | 8 us |
| Guard period | 0.8 us | 1.6 us |
| Subcarrier spacing | 312.5 KHz | 156.25 KHz |
| OFDM subcarrier | 52 | 52 |
| Number of pilot | 4 | 4 |
| Default BW | 20 MHz | 10 MHz |
| Data rate (Mbps) | 6, 9, 12, 18, 24, 36, 48, 54 Mbps | 3, 4, 5, 6, 9, 12, 18, 24, 27 Mbps |
| Frequency band | 5 GHz ISM | 5.9 GHz dedicated |

Channels of a DSRC band include a control channel and a service channel, and each channel is capable of performing data transmission at 3, 4.5, 6, 9, 12, 18, 24, and 27 Mbps. If an option channel (or optional channel) of 20 MHz exists, transmission at 6, 9, 12, 18, 24, 36, 48, and 54 Mbps may be performed. 6, 9, and 12 Mbps should be supported in all services and channels. And, in case of a control channel, although a preamble is 3 Mbps, the message itself is 6 Mbps. In case channels 174 and 176 and channels 180 and 182 are authorized by a frequency regulation organization, the channel sets may be channels 175 and 181 of 20 MHz, respectively. The remaining channel should be reserved for future usage. A short message or notification data, public safety alarm data, and so on, are broadcasted to all On Board Units (OBUs) through the control channel. The control channel and the service channel have been isolated in order to maximize efficiency and quality of service and to reduce interference between services.

Channel number 178 is a control channel, which automatically performs search and receives notification or data transmission, warning messages, and so on, from a Road Side Unit (RSU). All data of the control channel should be transmitted within 200 ms and is repeated at a pre-defined cycle. In a control channel, public safety warnings have the highest priority over any other private messages. Private messages that are larger than 20 Oms are transmitted through a service channel.

Private messages or long public safety messages, and so on, are transmitted through a service channel In order to prevent collision (or conflict), a scheme for detecting channel status (i.e., Carrier Sense Multiple Access (CSMA)) is used prior to the transmission.

Hereinafter, EDCA parameters in an Outside Context of BSS (OCB) mode will be defined. An OCB mode denotes a state where direct communication between nodes can be performed without any procedure of association with an AP. The following shows a basic EDCA parameter set for STA operations, in case dot11OCBActivated is True.

TABLE 9

| AC | CWmin | CWmax | AIFSN | TXOP limit |
| --- | --- | --- | --- | --- |
| AC_BK | aCWmin | aCWmax | 9 | 0 |
| AC_BE | aCWmin | aCWmax | 6 | 0 |
| AC_VI | (aCWmin + 1)/2 − 1 | aCWmin | 3 | 0 |
| AC_VO | (aCWmin + 1)/4 − 1 | (aCWmin + 1)/2 − 1 | 2 | 0 |

Characteristics of the OCB mode is as follows.

1. In a MAC header, To/From DS fields may be set to '0'.
2. Fields related to Address Individual or group destination MAC address may be used.

A BSSID field may be the same as a wildcard BSSID. (BSSID field=wildcard BSSID)

In a Data/Management frame, Address 1 may be an RA, Address 2 may be a TA, and Address 3 may be a wildcard BSSID.

3. An authentication process, an association process, or data confidentiality services of the IEEE 802.11 standard may not be used (or utilized).
4. A TxOP limit may be set to '0'.
5. Only a TC (TID) may be used.
6. STAs may not be required to synchronize to a common clock or use such mechanisms.

STAs may maintain a timing synchronization function (TSF) timer for purposes other than synchronization 7. The STA may send Action frames, and, if the STA maintains a TSF Timer, the STA may transmit Timing Advertisement frames.
8. The STA may send control frames excluding subtype PS-Poll, CF-End, and CF-End+CFAck.
9. The STA may send data frames of subtype Data, Null, QoS Data, and QoS Null.
10. An STA having dot11OCBActivated that is equal to true should not join (or participate in) or start a BSS.

Format of 11p PPDU

Figure 21:
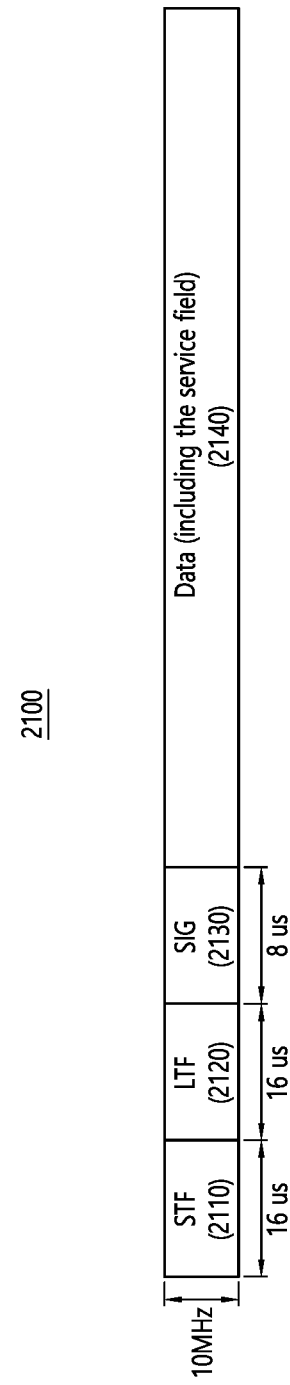
FIG. 21 shows a format of an 11p PPDU.

FIG. 21 shows a format of an 11p PPDU.

Referring to FIG. 21, a frame of the 802.11p standard (hereinafter referred to as 11p PPDU 2100) may support vehicle-to-vehicle (V2V) communication in a 5.9 GHz band. The 11p PPDU 2100 may include an STF 2110 for synchronization (sync) and Automatic Gain Control AGC, an LTF 2120 for channel estimation, and/or a SIG (or SIG field) 2130 including information related to a Data field 2140. The Data field 2140 may be configured to include 16 bits configuring the service field.

The 11p PPDU 2100 may be configured by applying the same OFDM numerology as the IEEE 802.11a standard for a 10 MHz bandwidth. For example, the IEEE 802.11p standard may be applied by 2x down-clocking the OFDM numerology for a 20 MHz bandwidth according to the IEEE 802.11a standard. Therefore, a symbol of the 11p PPDU 2100 may be configured to be longer than a symbol of a frame (or PPDU) of the IEEE 802.11a standard. A symbol of the 11p PPDU 2100 may have a symbol duration of 8 μs. The 11p PPDU 2100 may have a length that is two times longer than a frame according to the 802.11a standard in the aspect of time.

Format of NGV PPDU

Hereinafter, a technical characteristic that can provide interoperability of multiple system will be proposed. For example, multiple systems may include a system (IEEE 802.11bd standard) that is proposed for supporting through-put enhancement, coverage extension, and/or high speed for Vehicle-to-Everything (V2x) in a 5.9 GHz band, and/or a DSRC system that is based on the existing (or conventional) IEEE 802.11p standard.

In addition, the IEEE 802.11bd standard may be proposed for throughput improvement and coverage extension compared to the IEEE 802.11p standard. That is, when the PPDU of the IEEE 802.11bd standard (e.g., NGV PPDU) is used, compared to the case in which the PPDU of the IEEE 802.11p standard (e.g., the 11p PPDU 2100 of FIG. 21) is used, there are effects of throughput improvement and coverage extension.

The NGV PPDU described below may include a preamble, a data field contiguous to the preamble, and a midamble contiguous to the data field. In addition, the NGV PPDU may include an additional data field contiguous to the midamble. The number or period of symbols of the midamble in the NGV PPDU may be set in various ways. For example, the preamble of the NGV PPDU may include L-STF, L-LTF, L-SIG, RL-SIG, NGV-SIG, RNGV-SIG, NGV-STF, and/or NGV-LTF. The NGV midamble may be configured in the same format as the NGV-LTF. The aforementioned L-SIG, RL-SIG, NGV-SIG, and/or RNGV-SIG may be referred to as an L-SIG field, an RL-SIG field, an NGV-SIG field, and/or an RNGV-SIG field, respectively.

FIG. 22 shows the format of an NGV PPDU.

Referring to FIG. 22, the NGV PPDU 2200 may include L-STF 2210, L-LTF 2220, L-SIG 2230, RL-SIG 2240, NGV-SIG 2250, RNGV-SIG 2260, NGV-STF 2270, NGV-LTF 2280, and/or NGV data 2290.

The NGV PPDU 2200 may be configured at 10 MHz. The NGV PPDU 2200 may include a preamble (i.e., L-STF, L-LTF or L-SIG) of the 11p PPDU for backward compatibility or interoperability with the IEEE 802.11p standard. That is, since the preamble of the 11p PPDU is included in the NGV PPDU 2200, backward compatibility or interoperability with the IEEE 802.11p standard can be guaranteed. For example, the NGV PPDU 2200 may include the L-STF 2210, the L-LTF 2220, and/or the L-SIG 2230. For example, the L-STF 2210, the L-LTF 2220, and/or the L-SIG 2230 may be located at the front of the NGV PPDU 2200. In other words, when the NGV PPDU 2200 is transmitted, the L-STF 2210, the L-LTF 2220, and/or the L-SIG 2230 may be transmitted/received first.

The RL-SIG 2240 may be contiguous to the L-SIG 2230. The RL-SIG 2240 may include the same information fields as the L-SIG 2230 and may be modulated (e.g., BPSK) in the same manner as the L-SIG 2230.

The NGV PPDU 2200 may include the NGV-SIG 2250 including control information for NGV standards, RNGV-SIG 2260, NGV-STF 2270, and NGV-LTF 2280, and/or NGV-data 2290. The NGV-SIG 2250, RNGV-SIG 2260, NGV-STF 2270, NGV-LTF 2280, and/or NGV-data 2290 may be located after the RL-SIG 2240.

In the NGV PPDU 2200, the L-SIG 2230 may include a Rate field and a Length field. For example, the Rate field may be set to 4 bits representing 3 Mbps. The Length field may be set based on the 3 Mbps. Accordingly, the value of the Length field may be set to a value divisible by 3.

As an example, the Length field may be set as in Equation 12.

$$\text{Length} = \frac{TXTIME - 40}{8} \times 3 - 3 \quad \langle\text{Equation 12}\rangle$$

Referring to Equation 12, 'Length' may mean a value of the Length field. 'TxTIME' may mean a transmission time (or duration) of the NGV PPDU 2200. The TxTIME may be set as in Equation 13.

$$T\text{xTIME} = T_{L\text{-}STF} + T_{L\text{-}LTF} + T_{L\text{-}SIG} + T_{RL\text{-}SIG} + T_{NGV\text{-}SIG} + T_{RNGV\text{-}SIG} + T_{NGV\text{-}STF} + T_{NVG\text{-}LTF} + T_{SYML} \times N_{SYM} \quad \langle\text{Equation 13}\rangle$$

Referring to Equation 13, $T_{L\text{-}STF}$ may mean a transmission time of L-STF 2210. The $T_{L\text{-}LTF}$ may mean a transmission time of the L-LTF 2220. $T_{L\text{-}SIG}$ may mean a transmission time of the L-SIG 2230. $T_{RL\text{-}SIG}$ may mean a transmission time of the RL-SIG 2240. $T_{NGV\text{-}SIG}$ may mean a transmission time of the NGV-SIG 2250. $T_{RNGV\text{-}SIG}$ may mean a transmission time of RNGV-SIG 2260. $T_{NGV\text{-}STF}$ may mean a transmission time of the NGV-STF 2270. The $T_{NGV\text{-}LTF}$ may mean a transmission time of the NGV-LTF 2280. $T_{SYML}$ may mean the duration (or length) of a symbol of NGV data 2290. $N_{SYM}$ may mean the number of symbols of NGV data 2290.

Figure 23:
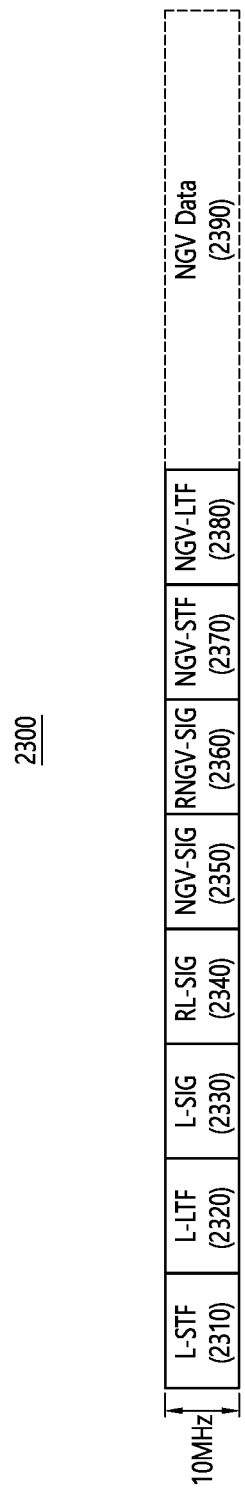
FIG. 23 shows a format of an NGV PPDU for performing 10 MHz transmission.

FIG. 23 shows a format of an NGV PPDU for performing 10 MHz transmission.

Referring to FIG. 23, for backward compatibility or interoperability with the IEEE 802.11p, an NGV PPDU 2300 may include fields (i.e., L-STF, L-LTF and/or L-SIG) of a frame according to the IEEE 802.11p standard (hereinafter referred to as an 11p PPDU). For example, the NGV PPDU 2300 may include an L-STF 2310, an L-LTF 2320 or an L-SIG 2330. Additionally, the NGV PPDU may include an RL-SIG 2340, an NGV-SIG 2350, an RNGV-SIG 2360, an NGV-STF 2370, an NGV-LTF 2380, and/or an NGV Data 2390.

The RL-SIG 2340 may be contiguous to the L-SIG 2330. The RL-SIG 2340 may be a field in which the L-SIG 2330 is repeated. In other words, the RL-SIG 2340 may include the same information field as the L-SIG 2330 and may be modulated by using the same method as the L-SIG 2330 (e.g., BPSK).

The NGV-SIG 2350 may be related to transmission information. For example, the NGV-SIG 2350 may include the transmission information. For example, the NGV-SIG 2350 may be configured to be equal to 24 bits. For example, the NGV-SIG 2350 may include information related to a Physical layer (PHY) Version, information related to a bandwidth, information related to an MCS, information related to a number of spatial streams, information related to a midamble periodicity, information related to an LTF format, information related to an LDPC Extra OFDM Symbol, information related to a CRC, and/or information related to a tail bit. BCC encoding based on a 1/2 coding rate may be applied to the NGV-SIG 2350.

The RNGV-SIG 2360 may be contiguous to the NGV-SIG 2350. The RNGV-SIG 2360 may be a field in which the NGV-SIG 2350 is repeated. In other words, the RNGV-SIG 2360 may include the same information field as the NGV-SIG 2350 and may be modulated by using the same method as the NGV-SIG 2350 (e.g., BPSK).

The NGV-STF 2370 may be configured by 2x down-clocking a 20 MHz VHT-STF that is configured according to the IEEE 802.11ac standard. The NGV-LTF 2380 may be configured by 2x down-clocking a 20 MHz VHT-LTF that is configured according to the IEEE 802.11ac standard.

The NGV-LTF 2380 may be configured based on at least one LTF format. For example, the NGV-LTF 2380 may be configured based on at least one of an NGV-LTF-1x format, an NGV-LTF-2x format, or a repeated NGV-LTF-2x format. Information related to the LTF format that is used in the NGV-LTF 2380 may be included in the NGV-SIG 2350.

For example, the NGV-LTF-2x format may be set as the default format. As another example, the NGV-LTF-1x format may be used for high-efficiency transmission of one spatial stream. As yet another example, the repeated NGV-LTF-2x format may be used for extended range transmissions. The repeated NGV-LTF-2x format may be configured by repeating the NGV-LTF-2x format from which 1.6 μs of one pre-appended cyclic prefix (CP) and guard interval (GI) are excluded. The repeated NGV-LTF-2x format may be used when dual carrier modulation (DCM) and BPSK modulation are applied to the NGV data 2390. For example, when the DCM and BPSK modulation are applied to the NGV data 2390, regardless of the information related to the LTF format included in the NGV-SIG 2350, the repeated NGV-LTF-2x format may be used in/applied to the NGV-LTF 2380.

For example, in the 10 MHz transmission, a sequence of the NGV-LTF-1x format may be configured as shown below in Equation 14.

$$NGV\text{-}LTF\text{-}1x \text{ sequence} = [1,0,1,0,-1,0,1,0,-1,0,-1,0,1,\\0,1,0,1,0,-1,0,1,0,1,0,1,0,1,0,0,0,-1,0,1,0,-1,0,-\\1,0,-1,0,-1,0,-1,0,1,0,-1,0,-1,0,-1,0,1,0,1,0,-1] \quad \text{<Equation 14>}$$

For example, in the 10 MHz transmission, a sequence of the NGV-LTF-2x format may be configured as shown below in Equation 15.

$$NGV\text{-}LTF\text{-}2x \text{ sequence} = [1,1,LTF\_\text{left},0,LTF\_\text{right},-1,-1] \quad \text{<Equation 15>}$$

Referring to Equation 15, LTF_left and LTF_right may be configured as shown below in Equation 16.

$$LTF\_\text{left} = [1,1,-1,-1,1,1,-1,1,-1,1,1,1,1,1,1,-1,-1,1,\\1,-1,1,-1,1,1,1,1]$$

$$LTF\_\text{right} = [1,-1,-1,1,1,-1,1,-1,1,-1,-1,-1,-1,1,\\1,-1,-1,1,-1,1-1,1,1,1,1] \quad \text{<Equation 16>}$$

The NGV data 2390 may include a service field, PHY pad bits, and/or a PSDU.

Although it is not shown in the drawing, the NGV PPDU 2300 may include a midamble that is contiguous to the NGV data 2390. Additionally, the NGV PPDU 2300 may include an additional data field that is contiguous to the midamble.

The midamble may be used for performing additional channel estimation. That is, the midamble has an effect of reducing the effect of Doppler shift.

The midamble may be inserted/configured in the NGV PPDU 2300 according to a designated periodicity. Information related to the designated periodicity may be included in the NGV-SIG 2350. For example, the NGV-SIG 2350 may include information related to the midamble periodicity. The midamble periodicity may be set to one of 4, 8 or 16. For example, when the midamble periodicity is set to 4, the NGV PPDU 2300 may include midamble(s) being inserted every 4 data symbols.

The midamble may be configured to have the same format as the NGV-LTF 2380. For example, the midamble may be configured of at least one of an NGV-LTF-1x format, an NGV-LTF-2x format, or a repeated NGV-LTF-2x format. Information related to the LTF format that is used in the midamble may be included in the NGV-SIG 2350.

Figure 24:
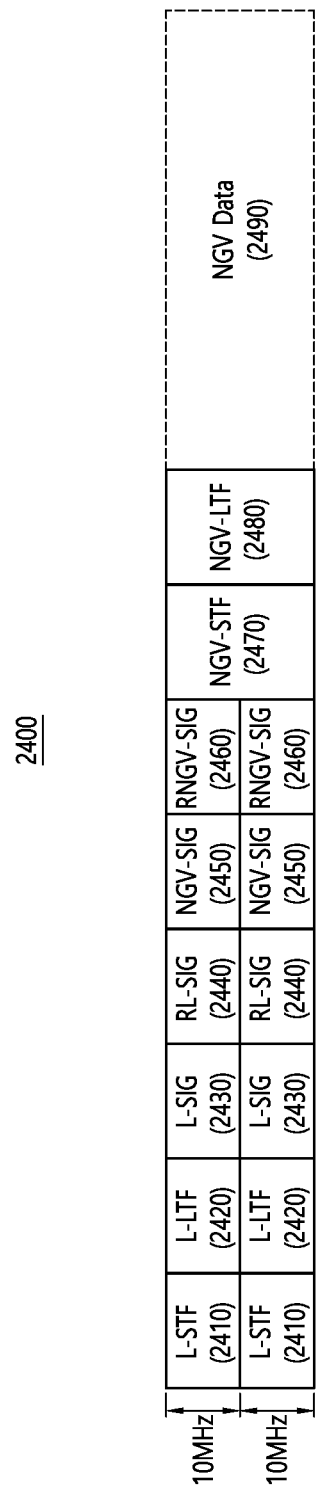
FIG. 24 shows a format of an NGV PPDU for performing 20 MHz transmission.

FIG. 24 shows a format of an NGV PPDU for performing 20 MHz transmission.

Referring to FIG. 24, an NGV PPDU 2400 may be configured of 20 MHz. The NGV PPDU 2400 may include an L-STF 2410, an L-LTF 2420, an L-SIG 2430, an RL-SIG 2440, an NGV-SIG 2450, an RNGV-SIG 2460, an NGV-STF 2470, an NGV-LTF 2480, and/or an NGV Data 2490.

The L-STF 2410, L-LTF 2420 or L-SIG 2430 may be configured by being duplicated in 10 MHz units. The L-STF 2410, L-LTF 2420 or L-SIG 2430 may be related to the L-STF 2310, L-LTF 2320 or L-SIG 2330 of FIG. 23.

According to an embodiment, the RL-SIG 2540, NGV-SIG 2550 or RNGV-SIG 2560 may also be configured by being duplicated in 10 MHz units. The RL-SIG 2540, NGV-SIG 2550 or RNGV-SIG 2560 may be related to the RL-SIG 2340, NGV-SIG 2350 or RNGV-SIG 2360 of FIG. 23, respectively.

The NGV-STF 2570 may be configured by 2x down-clocking a 40 MHz VHT-STF that is configured according to the IEEE 802.11ac standard. The NGV-LTF 2480 may be configured by 2x down-clocking a 40 MHz VHT-LTF that is configured according to the IEEE 802.11ac standard.

The NGV-LTF 2480 may be configured based on at least one LTF format. For example, the NGV-LTF 2480 may be configured based on at least one of an NGV-LTF-1x format, an NGV-LTF-2x format, or a repeated NGV-LTF-2x format.

For example, in the 20 MHz transmission, a sequence of the NGV-LTF-1x format may be configured as shown below in Equation 17.

$$NGV\text{-}LTF\text{-}1x \text{ sequence}[1,0,-1,0,1,0,-1,0,-1,0,1,0,\\1,0,-1,0,1,0\ 1,0,1,0,1,0,1,0,-1,0,1,0,-1,0,-1,0,-1,\\0,-1,0,-1,0,1,0,-1,0,-1,0,-1,0,1,0,1,0,-1,0,1,0,0,\\0,-1,0,1,0,1,0,-1,0,1,0,-1,0,-1,0,1,0,1,0,-1,0,1,\\0,1,0,1,0,1,0,1,0,-1,0,1,0,-1,0,-1,0,-1,0,-1,0,-1,\\0,1,0,-1,0,-1,0,-1,0,1,0,1] \quad \text{<Equation 17>}$$

For example, in the 20 MHz transmission, a sequence of the NGV-LTF-2x format may be configured as shown below in Equation 18.

$$NGV\text{-}LTF\text{-}2x \text{ sequence} = [LTF\_\text{left},1,LTF\_\text{right},-1,-\\1,-1,1,0,0,0,-1,1,1,-1,LTF\_\text{left},1,LTF\_\text{right}] \quad \text{<Equation 18>}$$

Referring to Equation 18, LTF_left and LTF_right may be configured as presented above in Equation 16.

The NGV data 2490 may include a service field, PHY pad bits, and/or a PSDU. The NGV data 2490 may be related to the NGV data 2390 of FIG. 23.

Although it is not shown in the drawing, similarly to the NGV PPDU 2300 of FIG. 23, the NGV PPDU 2400 may include a midamble that is contiguous to the NGV data 2490. Additionally, the NGV PPDU 2400 may include an additional data field that is contiguous to the midamble.

An example of this specification is related to an NGV PPDU (or 11 bd PPDU). The NGV PPDU may be used in various wireless communication systems, and, for example, the NGV PPDU may be used in an IEEE 802.11bd wireless LAN communication system.

The NGV PPDU may be referred to by using various terms. For example, the NGV PPDU may also be referred to as an NGV frame, an 11 bd frame, an 11 bd PPDU, and so on. Additionally, as another example, the NGV PPDU may also be referred to by using other various terms, such as a first type PPDU, a transmission PPDU, a reception PPDU, a WLAN PPDU, and so on. Hereinafter, for simplicity in the description, a frame of the IEEE 802.11bd standard may also be referred to as an NGV PPDU. Additionally, a PPDU according to the IEEE 802.11p standard may also be referred to as an 11p PPDU.

Similarly, an STA supporting the IEEE 802.11bd standard may also be referred to by using other various terms. For example, an STA supporting the IEEE 802.11bd standard may also be referred to as an 11 bd STA, an NGV STA, a transmitting STA or a receiving STA. Hereinafter, for simplicity in the description, the STA supporting the IEEE 802.11bd standard may be referred to as a transmitting STA or a receiving STA. Additionally, an STA supporting the IEEE 802.11p standard may be referred to as an 11p STA. Furthermore, the 5.9 GHz band may also be variously referred to as an NGV band, a reception band, a transmission band, and so on.

Configuration of Midamble of NGV PPDU

When the transmitting STA transmits an NGV PPDU (e.g., NGV PPDU(s) 2200, 2300, 2400), in order to reduce the effect of Doppler shift due to high speed, midamble(s) inserted between NGV-data fields may be periodically transmitted. A configuration in which the midamble is included in the NGV PPDU may be described with reference to FIG. 25.

Figure 25:
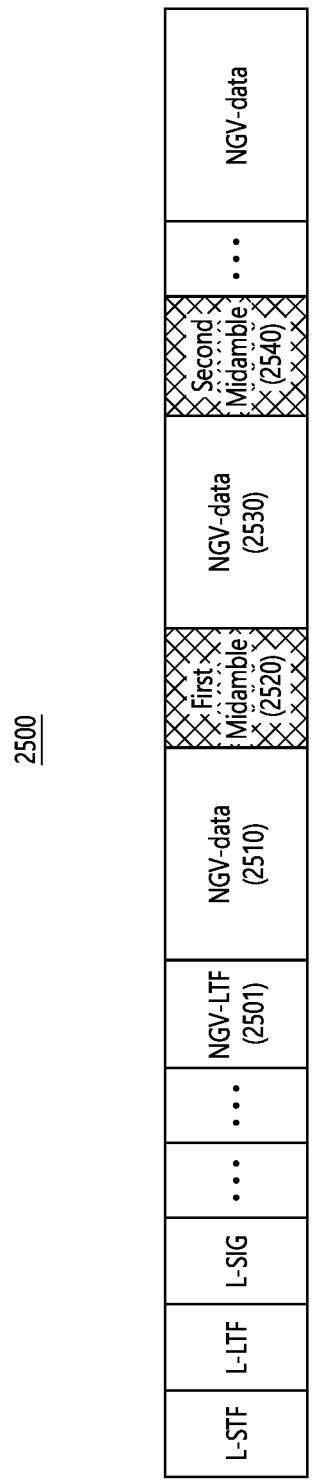
FIG. 25 shows the configuration of a midamble in the NGV PPDU.

FIG. 25 shows the configuration of a midamble in the NGV PPDU.

Referring to FIG. 25, the NGV PPDU may include at least one midamble.

According to an embodiment, the NGV PPDU 2500 may include a first midamble 2520 contiguous to the NGV-data 2510. The NGV PPDU 2500 may include NGV-data 2530 continuous to the first midamble 2520. The NGV PPDU 2500 may include a second midamble 2540 contiguous to the NGV-data 2530.

According to an embodiment, the midambles 2520 and 2540 may be inserted/configured in the middle of the NGV-data part at a specified period (i.e., the transmission periodicity of the midamble). For example, the NGV PPDU 2500 may include midambles 2520 and 2540 based on M-symbol periodicity after the NGV-LTF 2501. That is, each of the NGV-data 2510 and NGV-data 2530 may consist of M symbols. For example, M may be set to one of 4, 8, and 16.

Structure of Midamble

According to an embodiment, the midamble may be composed of NGV-LTF (e.g., 1x-LTF). According to an embodiment, the midamble may be composed of a compressed LTF (or a compressed LTF sequence). As an example, the midamble may be considered as 2x-compressed LTF (or 2x-LTF sequence). That is, the midamble and the NGV-LTF may be configured as one of 1x/2x LTF. In other words, the format of the midamble and the NGV-LTF may be set to one of 1x/2x LTF.

According to an embodiment, the LTF signal may be generated based on the LTF sequence, and the LTF signal may constitute the midamble. The LTF signal may be called variously. For example, the LTF signal may be referred to as an LTF or an LTF symbol. Hereinafter, for convenience of description, the LTF signal (e.g., NGV-LTF signal) may be described as LTF (e.g., NGV-LTF). As an example, the 1x-LTF signal may be described as 1x-LTF.

For example, the midamble and the NGV-LTF may be configured based on the same LTF (or LTF sequence) for transmission. For example, the midamble may be configured based on the 1x-LTF (or 1x-LTF sequence), and the NGV-LTF may be configured based on the same 1x-LTF (or 1x-LTF sequence).

As another example, the midamble may be configured based on a sequence different from that of the NGV-LTF for transmission. As an example, the NGV-LTF may be configured based on the 1x-LTF (or 1x-LTF sequence), and the midamble may be configured based on the 2x-LTF (or 2x-LTF sequence).

The above-described example is only one example and the present disclosure is not limited thereto. The NGV-LTF and the midamble may be variously configured through a combination of 1x/2x LTF.

The above-described 1x/2x LTF may be configured as follows.

1) 1x-LTF (normal LTF): The 1x-LTF may be configured such that an LTF sequence is carried on all available tones. For example, the 1x-LTF may be referred to as a second format related to an LTF sequence having a second interval. For example, the LTF sequence constituting the 1x-LTF may be set to non-zero(s) in all available tones. For example, the available tone may mean a tone excluding a DC tone and a guard tone from all tones within a bandwidth. The DC tone and guard tone may be set based on the bandwidth.

For example, in the 10 MHz bandwidth, the DC tone may be set to one (1) tone. The left guard tone may be set to four (4) tones. The right guard tone may be set to three (3) tones. Accordingly, the available tones at 10 MHz may be set to 56 tones. That is, the LTF sequence constituting the 1x-LTF of 10 MHz may be set to non-zeros in 56 tones. In addition, the LTF sequence constituting the 1x-LTF of 10 MHz may be set to zero in the DC tone of one (1) tone. The LTF sequence constituting the 1x-LTF of 10 MHz may be related to the NGV-LTF-2x sequence of Equation 15.

As another example, in the 20 MHz bandwidth, the DC tone may be set to three (3) tones. The left guard tone can be set to six (6) tones. The right guard tone can be set to five (5) tones. Accordingly, the available tones at 20 MHz may be set to 114 tones. That is, the LTF sequence constituting the 1x-LTF of 20 MHz may be set to non-zeros in 114 tones. In addition, the LTF sequence constituting the 1x-LTF of 20 MHz may be set to zeros in the DC tone of three (3) tones. The LTF sequence constituting the 1x-LTF of 20 MHz may be related to the NGV-LTF-2x sequence of Equation 18.

According to an embodiment, the 1x-LTF may be called variously. For example, the 1x-LTF may be referred to as 1x-compressed LTF. For another example, the 1x-LTF may be referred to as a 1x-LTF symbol.

2) 2x-compressed LTF: The 2x-compressed LTF may be configured such that the LTF sequence is carried in an interval of 2 tones within available tones. The 2x-compressed LTF may be configured by using only one of the two repeated signals within one symbol. Since only one of the two repeated signals is used, the length of the 2x-compressed LTF may be set to half (½) of the length of the 1x-compressed LTF. For example, the 2x-compressed LTF may be referred to as a first format related to an LTF sequence having a first interval. For example, the LTF sequence constituting the 2x-compressed LTF may be set to non-zero(s) at an interval of 2 tones within available tones. For example, the available tone may mean a tone excluding a DC tone and a guard tone from all tones within a bandwidth. The DC tone and guard tone may be set based on the bandwidth.

For example, in the 10 MHz bandwidth, the DC tone may be set to one (1) tone. Also, the available tones may be set to 56 tones. That is, the LTF sequence constituting the 2x-compressed LTF of 10 MHz may be set to zero (0) in the DC tone of 1 tone. In addition, the LTF sequence constituting the 2x-compressed LTF of 10 MHz may be set to non-zeros at an interval of 2 tones in the available tones of 56 tones. The LTF sequence constituting the 2x-compressed LTF of 10 MHz may be related to the NGV-LTF-1x sequence of Equation 14.

As another example, in the 20 MHz bandwidth, the DC tone may be set to 3 tones. Also, the available tones may be set to 114 tones. That is, the LTF sequence constituting the 2x-compressed LTF of 20 MHz may be set to '0' (zero) in the DC tone of 3 tones. In addition, the LTF sequence constituting the 2x-compressed LTF of 20 MHz may be set to 'non-zero' at an interval of 2 tones in the available tones of 114 tones. The LTF sequence constituting the 2x-compressed LTF of 20 MHz may be related to the NGV-LTF-1x sequence of Equation 17.

According to an embodiment, the 2x-compressed LTF may be called variously. For example, a 2x-compressed LTF may be referred to as a 2x-LTF. As another example, the 2x-compressed LTF may be referred to as a 2x-compressed LTF symbol.

According to an embodiment, the NGV PPDU may be transmitted in a high-speed environment in which Doppler shift has a large influence. Accordingly, the transmitting STA transmitting the NGV PPDU may configure the midamble based on the receiving environment (or the transmitting environment). In other words, the transmitting STA may set the format or period of the midamble based on the receiving environment. When the midamble is transmitted based on the receiving environment, there is an effect of increasing transmission efficiency (or reception performance).

As described above, in order to reduce overhead caused by the midamble, a 'compressed midamble' constructed based on a 2x-LTF sequence may be used. In addition, for more accurate channel estimation and Doppler tracking, the 'compressed midamble' may be repeatedly transmitted. A configuration in which the 'compressed midamble' is repeatedly transmitted may be referred to as a 'repeated compressed midamble'.

According to an embodiment, the 'compressed midamble' and/or the 'repeated compressed midamble' may be set in various ways. Hereinafter, specific examples of a 'compressed midamble' and/or a 'repeated compressed midamble' may be described. Hereinafter, for convenience of description, the 'compressed midamble' may be described through the '2x-compressed midamble', which is an example of the 'compressed midamble'.

Figure 26:
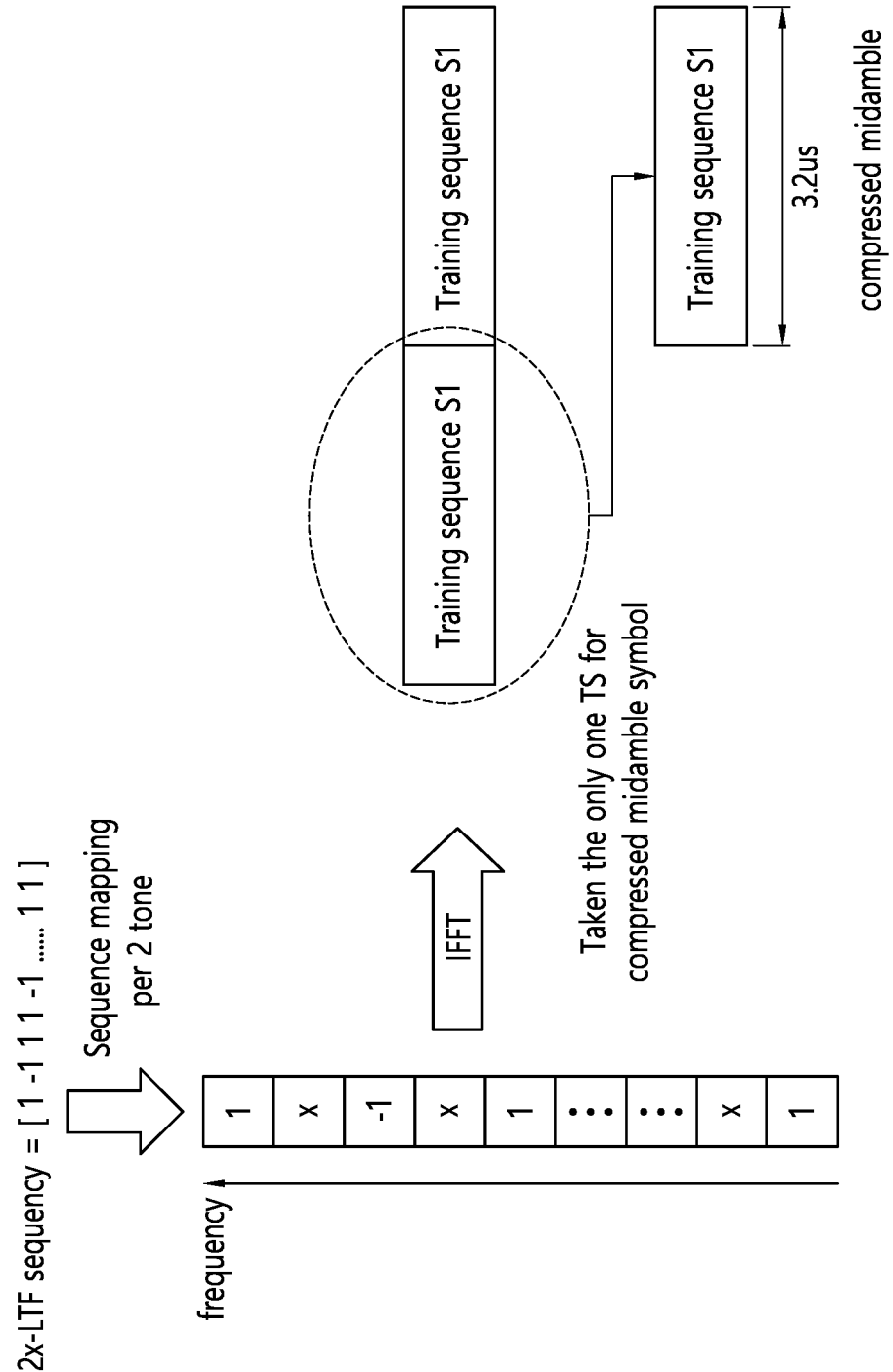
FIG. 26 shows an example in which a '2x-compressed midamble' is generated.

FIG. 26 shows an example in which a '2x-compressed midamble' is generated.

Referring to FIG. 26, the '2x-compressed midamble' may be configured based on a 2x-LTF sequence. In other words, the '2x-compressed midamble' may include the 2x-LTF sequence. The 2x-LTF sequence mapped at intervals of 2 tones in the frequency domain may have a structure in which the same sequence is repeated within one symbol in the time domain. In this case, in order to use the 'compressed midamble', a symbol may be configured using only one of two Training Sequences (TSs). In addition, in the case of repeated transmission, a symbol may be constructed by using all of the TSs formed in the time domain without separation.

For example, the transmitting STA may configure a 2x-LTF sequence based on intervals of 2 tones in the frequency domain. As shown, the tone(s) in which the 2x-LTF sequence is not configured/set may be represented by 'x'. As an example, the tone(s) in which the 2x-LTF sequence is not configured/set may be set to 0. The transmitting STA may perform an Inverse Fast Fourier Transform (IFFT) based on the 2x-LTF sequence. The transmitting STA may generate two TSs through the IFFT. The two TSs may be configured identically. In other words, the TS may be repeatedly configured in the time domain. Accordingly, the transmitting STA may configure a symbol through only one of the two TSs. The transmitting STA may configure a symbol through all of the two TSs during repeated transmission. That is, the '2x-compressed midamble' may be configured through only one of the two TSs. The 'repeated 2x-compressed midamble' can be configured through all two TSs.

Various GIs may be applied to the 2x-compressed midamble symbol configured based on the above-described embodiment for transmission through the NGV PPDU.

In the following specification, when the 2x-compressed midamble symbol is used, a technical feature for setting the length of the PPDU (i.e., the length of the NGV PPDU) in units of symbols may be described. The length described below may mean a duration.

1. The GI applied to the 2x-compressed midamble symbol may be set to be the same as a GI applied to the data. For example, the GI (or the length of the GI) may be set to 1.6 μs.

2. The 2x-compressed midamble symbol may be variously configured based on the GI. For example, when the GI is set to 1.6 μs, a 2x-compressed midamble symbol may be described with reference to FIG. 27.

Figure 27:
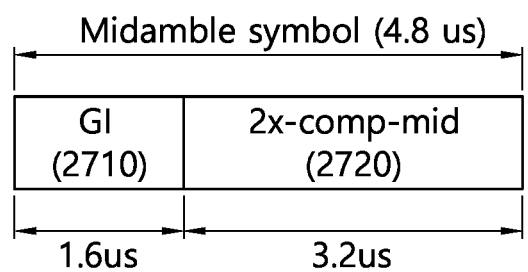
FIG. 27 shows an example of a symbol of a 2x-compressed midamble.

FIG. 27 shows an example of a symbol of a 2x-compressed midamble.

Referring to FIG. 27, a 2x-compressed midamble symbol 2700 may include a GI 2710 and a 2x-comp-mid 2720.

According to an embodiment, the 2x-compressed midamble symbol 2700 may be set to 4.8 μs. The GI 2710 may be set to 1.6 μs. The 2x-comp-mid 2720 may be set to 3.2 μs. For example, 2x-comp-mid 2720 may mean a symbol configured based on one of the two TSs described in FIG. 26. For example, the GI 2710 may be set as a short GI.

Hereinafter, when the GI is set to 1.6 μs, a technical feature for setting the length of the PPDU (i.e., the length of the NGV PPDU) in units of symbols may be described.

3. The length (or information related to the length) transmitted through the Length field of the L-SIG may be set based on 8 μs symbols. In other words, the Length field may include information related to the length (or a value on the length) of the PPDU (e.g., NGV PPDU). The information related to the length may be set in units of 8 μs. As an example, the receiving STA may check information related to the length (or duration) of the PPDU based on the value of the length field (i.e., the octet value).

When the midamble is included in the PPDU, the length (or duration) of the PPDU may not be set in units of 8 μs. Accordingly, various methods may be used to match the length (or duration) indicated in the Length field with the length (or duration) of the PPDU including the midamble. Hereinafter, a technical feature for matching the length indicated in the Length field with the length of the PPDU including the midamble may be described.

3-1. Since the length of the midamble is 4.8 μs, the length to be added to the PPDU may be changed based on the number of midambles. The length to be added based on the number of midambles included in the PPDU or the length of padding or packet extension to match the length of the PPDU in units of 8 μs may be set as shown in Table 10.

TABLE 10

| Number of midamble | Total length of midamble | Length for alignment |
|---|---|---|
| 1 | 4.8 us | 3.2 us |
| 2 | 9.6 us | 6.4 us |
| 3 | 14.4 us | 1.6 us |
| 4 | 19.2 us | 4.8 us |
| 5 | 24 | 0 us |
| 6 | 28.8 us | 3.2 us |
| 7 | 33.6 us | 6.4 us |
| 8 | 38.4 | 1.6 us |
| 9 | 43.2 | 4.8 us |
| 10 | 48 | 0 us |

Referring to Table 10, a total length of midamble and a length for alignment (or a length added for alignment) may be set based on the number of midambles. Based on the number of midambles, a length for alignment may be constantly repeated. For example, when there is one midamble, the length for alignment may be set to 3.2 μs. Even in the case of six (6) midambles, the length for alignment may be set to 3.2 μs.

The length for alignment may be repeated in the order of 3.2, 6.4, 1.6, 4.8, and 0 μs. Accordingly, using the five values, a length for alignment may be indicated based on the number of midambles. In other words, the length for alignment may be set to one of five values based on the number of midambles. In addition, the transmitting STA may set information related to the length for alignment to one of five values and transmit it.

3-2. As in the above-described embodiment, based on the number of midambles, the length added for alignment may be configured as [0, 1.6, 3.2, 4.8, 6.4]. That is, the length added for alignment may be configured as a multiple of 1.6 μs. Accordingly, a technical feature indicating a length added for alignment can be described in Sections 3-2-A and 3-2-B.

3-2-A. When indicating the length to be added for alignment through a multiple of 1.6 μs 3-2-A-i) In order to match the length of the PPDU in units of 8 μs, an indication (or information related to the added symbol) for symbols added may be set as in Equation 19.

$$\text{Add\_length} = \text{alpha} \times 1.6 \qquad \langle \text{Equation 19} \rangle$$

Referring to Equation 19, 'Add_length' may mean an added symbol (or length) and 'alpha' may be set to one of 0 to 4.

3-2-A-ii) According to an embodiment, the value of 'alpha' in Equation 19 may be indicated through 3-bit information. In other words, the 3-bit information may include information related to the 'alpha' value.

The value of 'alpha' set based on the 3-bit information may be set as shown in Table 11.

TABLE 11

| Bits | inform |
|---|---|
| 000 | 0 |
| 001 | 1 |
| 010 | 2 |
| 011 | 3 |
| 100 | 4 |
| 101 | reserved |
| 110 | reserved |
| 111 | reserved |

Referring to Table 11, the 'alpha' value may be set based on the 3-bit information. The transmitting STA may transmit information related to the 'alpha' value by transmitting the 3-bit information to the receiving STA. In Table 11, the 'alpha' value set based on the 3-bit information is exemplary and is not limited thereto. Based on the 3-bit information, the 'alpha' value may be variously set.

3-2-A-iii) According to an embodiment, the above-described 'alpha' may be indicated through NGV-SIG (or NGV-SIG field). In other words, the NGV-SIG may include information related to the 'alpha' value. For example, the 'alpha' value may be referred to as information such as packet extension, padding, or padding length. The 'alpha' value may be transmitted through information such as packet extension, padding, or padding length.

3-2-A-iv) When the above-described embodiment is applied, the value of the length field may be set as in Equation 20.

$$\text{Length} = \frac{TXTIME - 40}{8} \times 3 - 3 \qquad \langle \text{Equation 20} \rangle$$

Referring to Equation 20, 'Length' may mean a value of the length field. It may mean a transmission time (or duration) of a PPDU (e.g., NGV PPDU) of 'TxTIME'. The TxTIME may be set as in Equation 21.

$$TxTIME = T_{L\text{-}STF} + T_{L\text{-}LTF} + T_{L\text{-}SIG} + T_{RL\text{-}SIG} T_{NGV\text{-}SIG} + T_{RNGV\text{-}SIG} + T_{NGV\text{-}STF} + T_{NVG\text{-}LTF} + T_{SYML} \times N_{SYM} + T_{SYML\_MID} \times N_{SYM\_MID} + 1.6 \times \text{alpha} \qquad \langle \text{Equation 21} \rangle$$

Referring to Equation 21, $T_{L\text{-}STF}$ may mean a transmission time of the L-STF. $T_{L\text{-}LTF}$ may mean a transmission time of the L-LTF. $T_{L\_SIG}$ may mean a transmission time of the L-SIG. $T_{RL\text{-}SIG}$ may mean a transmission time of the RL-SIG. $T_{NGV\text{-}SIG}$ may mean a transmission time of the NGV-SIG. $T_{RNGV\text{-}SIG}$ may mean a transmission time of the RNGV-SIG. $T_{NGV\text{-}STF}$ may mean a transmission time of the NGV-STF. $T_{NGV\text{-}LTF}$ may mean a transmission time of the NGV-LTF. $T_{SYML}$ may mean the duration (or length) of a symbol of the NGV data. $N_{SYM}$ may mean the number of symbols of the NGV data. $T_{SYML\_MID}$ may mean the symbol length of the midamble. $N_{SYM\_MID}$ may mean the number of midambles. The '1.6×alpha' may mean a length for alignment. That is, '1.6×alpha' may mean an added symbol (or length).

According to an embodiment, 'alpha' (or '1.6×alpha') may be referred to as packet extension, padding, or padding length.

3-2-B. When indicating the length to be added for alignment through Length 3-2-B-i) An indication for a symbol (or length) added to match the length of the PPDU in units of 8 μs may be set as in Equation 22. The indication for the added symbol may be referred to as information related to the added symbol.

$$\text{Add\_length} = \text{alpha} \qquad \langle \text{Equation 22} \rangle$$

Referring to Equation 22, 'add_length' may mean an added symbol (or length), and 'alpha' can be set to one of 0, 1.6, 3.2, 4.8, and 6.4 μs.

3-2-B-ii) According to an embodiment, the 'alpha' value of Equation 22 may be indicated through 3-bit information. In other words, the 3-bit information may include information related to the 'alpha' value.

An 'alpha' value set based on 3-bit information may be set as shown in Table 12.

TABLE 12

| Bits | inform |
|---|---|
| 000 | 0 |
| 001 | 1.6 us |
| 010 | 3.2 us |
| 011 | 4.8 us |
| 100 | 6.4 us |
| 101 | reserved |
| 110 | reserved |
| 111 | reserved |

Referring to Table 12, the 'alpha' value may be set based on 3-bit information. The transmitting STA may transmit information related to the 'alpha' value by transmitting the 3-bit information to the receiving STA. In Table 12, the 'alpha' value set based on the 3-bit information is exemplary and is not limited thereto. Based on the 3-bit information, the 'alpha' value may be variously set.

3-2-B-iii) According to an embodiment, the above-described alpha may be indicated through NGV-SIG (or NGV-SIG field). In other words, the NGV-SIG may include information related to the 'alpha' value. For example, the 'alpha' value may be referred to as information such as packet extension, padding, or padding length. For example, the 'alpha' value may be transmitted through information such as packet extension, padding, or padding length.

3-2-B-iv) When the above-described embodiment is applied, the value of the length field may be set as in Equation 23.

$$\text{Length} = \frac{TXTIME - 40}{8} \times 3 - 3 \quad \langle\text{Equation 23}\rangle$$

Referring to Equation 23, 'Length' may mean a value of the length field. It may mean a transmission time of a PPDU (e.g., NGV PPDU) of 'TxTIME'. The TxTIME may be set as in Equation 24.

$$TxTIME = T_{L\text{-}STF} + T_{L\text{-}LTF} + T_{L\text{-}SIG} + T_{RL\text{-}SIG} + T_{NGV\text{-}SIG} + T_{RNGV\text{-}SIG} + T_{NGV\text{-}STF} + T_{NVG\text{-}LTF} + T_{SYML} \times N_{SYM} + T_{SYML\_MID} \times N_{SYM\_MID} + \text{alpha} \quad \langle\text{Equation 24}\rangle$$

Referring to Equation 24, $T_{L\text{-}STF}$ may mean a transmission time of the L-STF. $T_{L\text{-}LTF}$ may mean a transmission time of the L-LTF. $T_{L\text{-}SIG}$ may mean a transmission time of the L-SIG. $T_{RL\text{-}SIG}$ may mean a transmission time of the RL-SIG. $T_{NGV\text{-}SIG}$ may mean a transmission time of the NGV-SIG. $T_{RNGV\text{-}SIG}$ may mean a transmission time of the RNGV-SIG. $T_{NGV\text{-}STF}$ may mean a transmission time of the NGV-STF. $T_{NGv\text{-}LTF}$ may mean a transmission time of the NGV-LTF. $T_{SYML}$ may mean the duration (or length) of a symbol of the NGV data. $N_{SYM}$ may mean the number of symbols of the NGV data. $T_{SYML\_MID}$ may mean the symbol length of the midamble. $N_{SYM\_MID}$ may mean the number of midambles. The 'alpha' may mean a length for alignment. That is, 'alpha' may mean an added symbol (or length).

3-2-B-v) According to an embodiment, the 'alpha' may be referred to as packet extension, padding, or padding length.

3-3. According to an embodiment, in order to match the length indicated in the Length field with the length of the PPDU (e.g., NGV PPDU) transmitted with the midamble, a symbol of a specific length may be added to the end of the PPDU. In other words, the PPDU may include a symbol of a specific length at the end of the PPDU.

3-3-A. For example, when a midamble is used, packet extension may be added to align the PPDU length.

Figure 28:
FIG. 28 shows an example in which packet extension is added to align the PPDU length.

FIG. 28 shows an example in which packet extension is added to align the PPDU length.

Referring to FIG. 28, a PPDU 2800 may include a packet extension 2810. The packet extension 2810 may be added/used to align the PPDU length.

3-3-B. For example, when the midamble is used, padding may be added to align the PPDU length.

Figure 29:
FIG. 29 shows an example in which padding is added to align the PPDU length.

FIG. 29 shows an example in which padding is added to align the PPDU length.

Referring to FIG. 29, a PPDU 2900 may include a padding 2910. The padding 2910 may be added/used to align the PPDU length.

3-4. In the above-described embodiment, a case in which the GI value is 1.6 μs has been described as an example, but the above-described embodiment may be applied even when a different GI value is used. That is, even when various GI values are used, the above-described embodiment may be applied to match the PPDU length alignment. According to an embodiment, a GI value of 3.2 μs may be used.

3-5. According to an embodiment, two values may be used as the GI. For example, 0.8 μs and 1.6 μs may be used as GI values. In this case, information related to packet extension or padding may be indicated using 3 bits (or 3-bit information). In other words, the 3 bits (or the 3-bit information) may include information related to the packet extension or padding.

Information related to packet extension or padding set based on 3-bit information may be set as shown in Table 13. Information related to the packet extension or padding may be related to the 'alpha' value described in Section 3-2-B.

TABLE 13

| Bits | inform |
|---|---|
| 000 | 0 |
| 001 | 1.6 us |
| 010 | 3.2 us |
| 011 | 4.0 us |
| 100 | 4.8 us |
| 101 | 6.4 us |
| 110 | reserved |
| 111 | reserved |

Referring to Table 13, information (or 'alpha' value) related to the packet extension or padding may be set based on the 3-bit information. The transmitting STA may transmit information related to the packet extension or padding by transmitting the 3-bit information to the receiving STA. Specific values set based on the 3-bit information in Table 13 are exemplary and the present disclosure is not limited thereto. Information related to the packet extension or padding may be variously set based on the 3-bit information.

3-6. The information related to the packet extension or padding described in Table 13 may be indicated using 3 bits constituting the NGV-SIG. In other words, 3 bits of the NGV-SIG may include information related to the packet extension or padding.

3-7. According to an embodiment, only 0.8 μs among the GI values described in Section 3-5 may be used. When 0.8 μs is used as the GI value, since the length (or duration) of the midamble is 4 μs, the length (or symbol) to be added may be 0 or 4 μs.

In this case, the transmitting STA may transmit information related to the packet extension or padding applied to the PPDU based on the 1-bit indication in the NGV-SIG. The 1 bit information can be set/configured in various ways. For example, when the 1 bit information is set to a first value (e.g., 0), it may indicate that the length of packet extension or padding is 0 μs. When 1 bit information is set to a second value (e.g., 1), it may indicate that the length of packet extension or padding is 4 μs.

3-8. According to an embodiment, unlike the above-described embodiment, long GI may be used to reduce the influence on delay spread and inter symbol interference (ISI). For example, the long GI applied in the 802.11bd standard may be 3.2 μs.

3-8-A. The length of the compressed midamble set based on the above-described long GI may be set to 6.4 μs. That is, in FIG. 27, the GI may be changed to 3.2 μs. A length required for PPDU length alignment based on the number of midambles may be set as shown in Table 14.

TABLE 14

| Number of midamble | Total length of midamble | Length for alignment |
|---|---|---|
| 1 | 6.4 us | 1.6 us |
| 2 | 12.8 us | 3.2 us |
| 3 | 19.2 us | 4.8 us |
| 4 | 25.6 us | 6.4 us |
| 5 | 32 | 0 us |
| 6 | 38.4 us | 1.6 us |
| 7 | 44.8 us | 3.2 us |
| 8 | 51.2 us | 4.8 us |
| 9 | 57.6 us | 6.4 us |
| 10 | 64 us | 0 us |

Referring to Table 14, based on the number of midambles, the length for alignment may be constantly repeated. For example, 1.6 μs, 3.2 μs, 4.8 μs, 6.4 μs, or 0 μs may be repeated as the length for alignment. Accordingly, based on the five values (0 μs, 1.6 μs, 3.2 μs, 4.8 μs, 6.4 μs), an additional length (or a length for alignment) according to the number of midambles may be indicated.

According to an embodiment, the above-described information may be indicated using the 3-bit information of the NGV-SIG. In other words, the 3-bit information of the NGV-SIG may include information related to the length for alignment. For example, information related to the length for alignment may be transmitted to the receiving STA through the above-described embodiment (e.g., Section 3-2-A-iii)).

Figure 30:
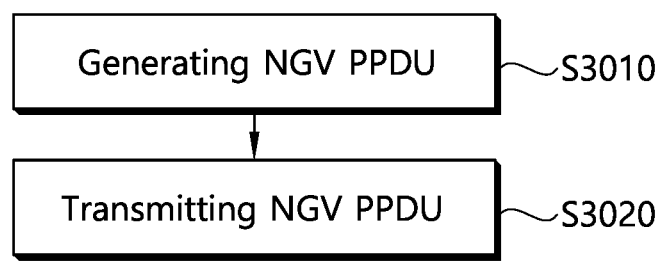
FIG. 30 is a flowchart illustrating an operation of a transmitting STA.

FIG. 30 is a flowchart illustrating an operation of a transmitting STA.

Referring to FIG. 30, in step S3010, the transmitting STA may generate an NGV PPDU.

The NGV PPDU may include a preamble, a data field, and at least one midamble and packet extension field.

According to an embodiment, the preamble includes a legacy signal (L-SIG) field, a repeated signal field in which the L-SIG field is repeated, an NGV signal field including control information for NGV PPDU, a repeated NGV signal field in which the NGV signal field is repeated, and an NGV short training field (STF) and an NGV long training field (LTF) for channel estimation.

For example, the legacy signal (L-SIG) field may include L-SIG.

For example, the repeated signal field may include the same information field as the legacy signal (L-SIG) field. In addition, the repeated signal field may be modulated (e.g., BPSK) in the same manner as the legacy signal field (L-SIG). The repeat signal field may include RL-SIG.

For example, the NGV signal field may be related to transmission information. The NGV signal field may include NGV-SIG.

For example, the repeated NGV signal field may include the same information as the NGV signal field. The repeated NGV signal field may include RNGV-SIG.

According to an embodiment, the at least one midamble may refer to a set of midambles transmitted at a designated symbol periodicity in the data field. The designated symbol periodicity may be set to one of 4, 8, and 16 symbols.

For example, the at least one midamble may include a first midamble and a second midamble. For example, when the designated symbol periodicity is set to 4 symbols, 4 symbols (or data symbols) may be transmitted between the first midamble and the second midamble.

For example, a first midamble among at least one midamble may include an LTF signal and a guard interval (GI) related to the LTF signal. As an example, the duration of the LTF signal may be set to 3.2 μs. The duration of the GI may be set to 1.6 μs. The duration of the first midamble may be set to 4.8 μs. All of the midamble(s) included in the at least one midamble may be set/configured in the same format as the first midamble.

Among an LTF sequence having the first interval and an LTF sequence having the second interval, the LTF signal may be configured based on the LTF sequence having the first interval. The first interval may be set to twice the second interval.

Specifically, the LTF sequence having the first interval may be set based on available tones. As an example, the LTF sequence having the first interval may be configured based on the first interval within the available tones. The available tones may refer to tones excluding DC tone(s) and guard tones from all tones within a bandwidth. Accordingly, in the LTF sequence having the first interval, DC tone(s) (e.g., one tone or three tones) may be set to zero(s). Also, the available tones of the LTF sequence having the first interval may be set to non-zeros at the first interval. As an example, the LTF sequence having the first interval may be set to non-zeros at an interval of 2 tones.

Specifically, the LTF sequence having the second interval may be set based on available tones. As an example, the LTF sequence having the second interval may be configured based on the second interval within the available tones. The available tones may refer to tones excluding DC tone(s) and guard tones from all tones within a bandwidth. Accordingly, in the LTF sequence having the second interval, DC tones (e.g., one tone or three tones) may be set to zero. Also, the available tones of the LTF sequence having the second interval may be set to non-zeros at the second interval. As an example, the LTF sequence having the second interval may be set to non-zeros in all available tones.

According to an embodiment, the duration of the packet extension field may be set based on the number of at least one midamble. For example, the duration of the packet extension field may be set to one of 0 μs, 1.6 μs, 3.2 μs, 4.8 μs, and 6.4 μs. For example, the duration of the packet extension field may be repeated in the order of 3.2 μs, 6.4 μs, 1.6 μs, 4.8 μs, and 0 μs based on the number of at least one midamble. In other words, the duration of the packet extension field may be identically set with a periodicity of five midambles.

Specifically, the duration of the NGV PPDU may be set to a multiple of 8 μs. When at least one midamble is included, the duration of the NGV PPDU not including the packet extension field may not be set to a multiple of 8 μs. Accordingly, the transmitting STA may maintain the duration of the NGV PPDU as a multiple of 8 μs based on the packet extension field.

According to an embodiment, the preamble may include 3-bit information related to the packet extension field. For example, the 3-bit information related to the packet extension field may be included in the NGV signal field which is included in the preamble. For example, the 3-bit information may include duration information related to the packet extension field.

As an example, the 3-bit information may indicate one of 0 μs, 1.6 μs, 3.2 μs, 4.8 μs, and 6.4 μs. The 3-bit information may be set as shown in Table 12.

As an example, the 3-bit information may represent an 'alpha' value. The 'alpha' value may be set to one of 0 to 4. That is, the 3-bit information may represent one of 0 to 4. The duration for the extended field may be set to 1.6*alpha. '*' may mean multiplication. The 3-bit information may be set as shown in Table 11.

For example, when the duration of one midamble (e.g., the first midamble) among the at least one midamble is set to 4.8 μs and the number of the at least one midamble is one (1), the duration for the at least one midamble may be set to 4.8 μs. In order to set the duration of the NGV PPDU to a multiple of 8 μs, the duration for the packet extension field may be set to 3.2 μs.

For example, when the duration of one midamble (e.g., the first midamble) among the at least one midamble is set to 4.8 μs and the number of the at least one midamble is three (3), the duration for the at least one midamble may be set to 14.4 μs. In order to set the duration of the NGV PPDU to a multiple of 8 μs, the duration for the packet extension field may be set to 1.6 μs.

According to an embodiment, the duration of the above-described field (e.g., packet extension field, midamble) may mean the duration of a symbol in which the field is transmitted. In other words, the above-described field may be transmitted through a symbol, and the duration of the symbol may mean a duration with respect to the above-described field. For example, the duration of the packet extension field may mean the duration of a symbol in which the packet extension field is transmitted. For another example, the duration of the midamble may mean the duration of a symbol (or midamble symbol) through which the midamble is transmitted.

In step S3020, the transmitting STA may transmit an NGV PPDU. The transmitting STA may transmit the NGV PPDU through a 5.9 GHz band based on a frequency spacing of 156.25 kHz. In other words, the NGV PPDU may be transmitted through the 5.9 GHz band based on a frequency spacing of 156.25 kHz.

Figure 31:
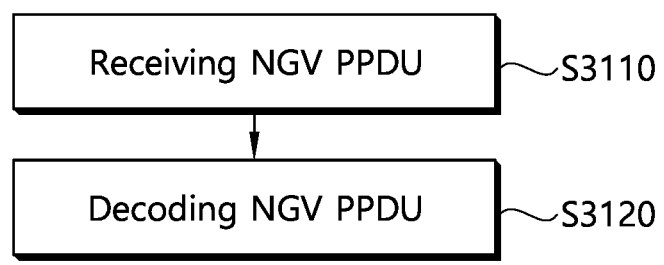
FIG. 31 is a flowchart for explaining an operation of a receiving STA.

FIG. 31 is a flowchart for explaining an operation of a receiving STA.

Referring to FIG. 31, in step S3110, a receiving STA may receive an NGV PPDU.

The receiving STA may receive the NGV PPDU through a 5.9 GHz band based on a frequency spacing of 156.25 kHz. In other words, the NGV PPDU may be received through the 5.9 GHz band based on a frequency spacing of 156.25 kHz.

The NGV PPDU may include a preamble, a data field, and at least one midamble and packet extension field.

According to an embodiment, the preamble includes a legacy signal (L-SIG) field, a repeated signal field in which the L-SIG field is repeated, an NGV signal field including control information for NGV PPDU, a repeated NGV signal field in which the NGV signal field is repeated, and an NGV short training field (STF) and an NGV long training field (LTF) for channel estimation.

For example, the legacy signal (L-SIG) field may include L-SIG.

For example, the repeated signal field may include the same information field as the legacy signal (L-SIG) field. In addition, the repeated signal field may be modulated (e.g., BPSK) in the same manner as the legacy signal field (L-SIG). The repeat signal field may include RL-SIG.

For example, the NGV signal field may be related to transmission information. The NGV signal field may include NGV-SIG.

For example, the repeated NGV signal field may include the same information as the NGV signal field. The repeated NGV signal field may include RNGV-SIG.

According to an embodiment, the at least one midamble may refer to a set of midambles transmitted at a designated symbol periodicity in the data field. The designated symbol periodicity may be set to one of 4, 8, and 16 symbols.

For example, the at least one midamble may include a first midamble and a second midamble. For example, when the designated symbol periodicity is set to 4 symbols, 4 symbols (or data symbols) may be transmitted between the first midamble and the second midamble.

For example, a first midamble among at least one midamble may include an LTF signal and a guard interval (GI) related to the LTF signal. As an example, the duration of the LTF signal may be set to 3.2 μs. The duration of the GI may be set to 1.6 μs. The duration of the first midamble may be set to 4.8 μs. All of the midamble(s) included in the at least one midamble may be set/configured in the same format as the first midamble.

Among an LTF sequence having the first interval and an LTF sequence having the second interval, the LTF signal may be configured based on the LTF sequence having the first interval. The first interval may be set to twice the second interval.

Specifically, the LTF sequence having the first interval may be set based on available tones. As an example, the LTF sequence having the first interval may be configured based on the first interval within the available tones. The available tones may refer to tones excluding DC tone(s) and guard tones from all tones within a bandwidth. Accordingly, in the LTF sequence having the first interval, DC tone(s) (e.g., one tone or three tones) may be set to zero(s). Also, the available tones of the LTF sequence having the first interval may be set to non-zeros at the first interval. As an example, the LTF sequence having the first interval may be set to non-zeros at an interval of 2 tones.

Specifically, the LTF sequence having the second interval may be set based on available tones. As an example, the LTF sequence having the second interval may be configured based on the second interval within the available tones. The available tones may refer to tones excluding DC tone(s) and guard tones from all tones within a bandwidth. Accordingly, in the LTF sequence having the second interval, DC tones (e.g., one tone or three tones) may be set to zero. Also, the available tones of the LTF sequence having the second interval may be set to non-zeros at the second interval. As an example, the LTF sequence having the second interval may be set to non-zeros in all available tones.

According to an embodiment, the duration of the packet extension field may be set based on the number of at least one midamble. For example, the duration of the packet extension field may be set to one of 0 μs, 1.6 μs, 3.2 μs, 4.8 μs, and 6.4 μs. For example, the duration of the packet extension field may be repeated in the order of 3.2 μs, 6.4 μs, 1.6 μs, 4.8 μs, and 0 μs based on the number of at least one midamble. In other words, the duration of the packet extension field may be identically set with a periodicity of five midambles.

Specifically, the duration of the NGV PPDU may be set to a multiple of 8 μs. When at least one midamble is included, the duration of the NGV PPDU not including the packet extension field may not be set to a multiple of 8 μs. Accordingly, the duration of the NGV PPDU may be maintained as a multiple of 8 μs based on the packet extension field.

According to an embodiment, the preamble may include 3-bit information related to the packet extension field. For example, the 3-bit information related to the packet extension field may be included in the NGV signal field which is included in the preamble. For example, the 3-bit information may include duration information related to the packet extension field.

As an example, the 3-bit information may indicate one of 0 μs, 1.6 μs, 3.2 μs, 4.8 μs, and 6.4 μs. The 3-bit information may be set as shown in Table 12.

As an example, the 3-bit information may represent an 'alpha' value. The 'alpha' value may be set to one of 0 to 4. That is, the 3-bit information may represent one of 0 to 4. The duration for the extended field may be set to 1.6*alpha. '*' may mean multiplication. The 3-bit information may be set as shown in Table 11.

When the duration of one midamble (e.g., the first midamble) among the at least one midamble is set to 4.8 μs and the number of the at least one midamble is one (1), the duration for the at least one midamble may be set to 4.8 μs. In order to set the duration of the NGV PPDU to a multiple of 8 μs, the duration for the packet extension field may be set to 3.2 μs.

When the duration of one midamble (e.g., the first midamble) among the at least one midamble is set to 4.8 μs and the number of the at least one midamble is three (3), the duration for the at least one midamble may be set to 14.4 μs. In order to set the duration of the NGV PPDU to a multiple of 8 μs, the duration for the packet extension field may be set to 1.6 μs.

According to an embodiment, the duration of the above-described field (e.g., packet extension field, midamble) may mean the duration of a symbol in which the field is transmitted. In other words, the above-described field may be transmitted through a symbol, and the duration of the symbol may mean a duration with respect to the above-described field. For example, the duration of the packet extension field may mean the duration of a symbol in which the packet extension field is transmitted. For another example, the duration of the midamble may mean the duration of a symbol (or midamble symbol) through which the midamble is transmitted.

In step S3120, the receiving STA may decode the NGV PPDU. The receiving STA may decode the NGV PPDU based on the preamble and at least one midamble.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chip(s) 114 and/or 124 of FIG. 1, or implemented based on the processor(s) 111 and/or 121 and the memory(s) 112 and/or 122 of FIG. 1, or, may be implemented based on the processor 610 and the memory 620 of FIG. 19. For example, the apparatus of the present specification includes a memory, and a processor operatively coupled to the memory, wherein the processor is configured to: receive a Next Generation V2x Physical Protocol Data Unit (NGV PPDU), wherein the NGV PPDU includes a preamble, a data field, at least one midamble, and a packet extension field, wherein a duration of the packet extension field is set based on a number of the at least one midamble, wherein the preamble includes 3-bit information related to the packet extension field; and decode the NGV PPDU based on the preamble and the at least one midamble.

The technical features of the present specification may be implemented based on a CRM (computer readable medium). For example, CRM proposed by the present specification may store instructions that perform operations comprising: receiving a Next Generation V2x Physical Protocol Data Unit (NGV PPDU), wherein the NGV PPDU includes a preamble, a data field, at least one midamble, and a packet extension field, wherein a duration of the packet extension field is set based on a number of the at least one midamble, wherein the preamble includes 3-bit information related to the packet extension field; and decoding the NGV PPDU based on the preamble and the at least one midamble. The instructions stored in the CRM of the present specification may be executed by at least one processor. At least one processor related to CRM in the present specification may be the processor(s) 111 and/or 121 or the processing chip(s) 114 and/or 124 of FIG. 1, or the processor 610 of FIG. 19. Meanwhile, the CRM of the present specification may be the memory(s) 112 and 122 of FIG. 1, the memory 620 of FIG. 19, or a separate external memory/storage medium/disk.

The above-described technical characteristics of the present specification may be applied to various applications or business models. For example, the UE, Terminal, STA, Transmitter, Receiver, Processor, and/or Transceiver, and so on, that are described in the present specification may be applied to vehicles that support autonomous driving or prior art vehicles that support autonomous driving.

Figure 32:
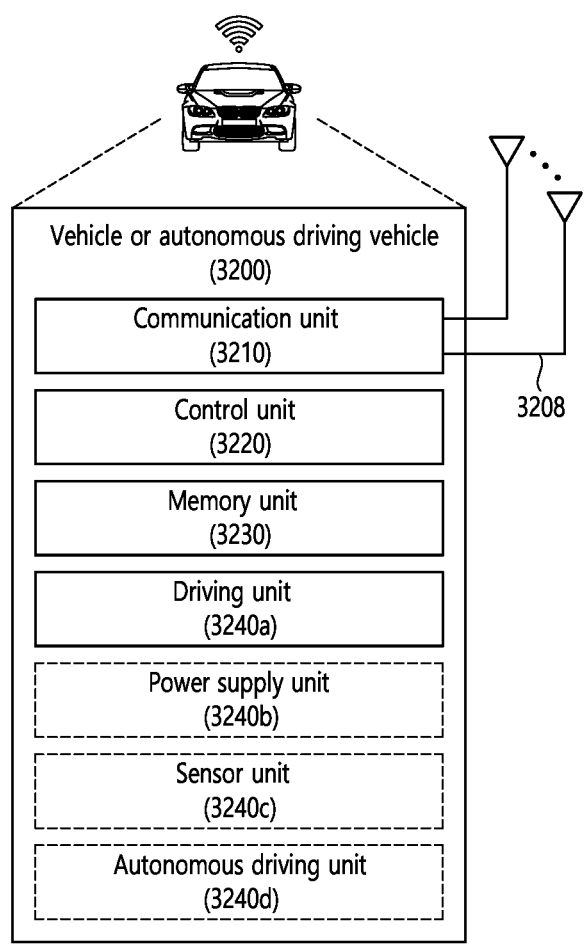
FIG. 32 shows a vehicle or an autonomous driving vehicle applied to the present specification.

FIG. 32 shows a vehicle or an autonomous driving vehicle applied to the present specification. The vehicle or autonomous driving vehicle may be implemented by a mobile robot, a car, a train, a manned/unmanned Aerial Vehicle (AV), a ship, and so on.

A memory unit 3230 shown in FIG. 32 may be included in the memory(s) 112, 122 shown in FIG. 1. Additionally, a communication unit 3210 shown in FIG. 32 may be include in the transceiver(s) 113, 123 and/or processor(s) 111, 121 shown in FIG. 1. Furthermore, the remaining devices that are shown in FIG. 32 may be included in the processor(s) 111, 121 shown in FIG. 1.

Referring to FIG. 32, a vehicle or autonomous driving vehicle 3200 may include an antenna unit 3208, a communication unit 3210, a control unit 3220, a memory unit 3230, a driving unit 3240*a*, a power supply unit 3240*b*, a sensor unit 3240*c*, and/or an autonomous driving unit 3240*d*. The antenna unit 3208 may be configured as a part of the communication unit 3210.

The communication unit 3210 may transmit and receive signals (e.g., data and control signals) to and from external devices such as other vehicles, BSs (e.g., gNBs and road side units), and servers. The control unit 3220 may perform various operations by controlling elements of the vehicle or the autonomous driving vehicle 3200. The control unit 3220 may include an Electronic Control Unit (ECU). The driving unit 3240*a* may cause the vehicle or the autonomous driving vehicle 3200 to drive on a road. The driving unit 3240*a* may include an engine, a motor, a powertrain, a wheel, a brake, a steering device, and so on. The power supply unit 3240*b* may supply power to the vehicle or the autonomous driving vehicle 3200 and include a wired/wireless charging circuit, a battery, and so on. The sensor unit 3240*c* may acquire a vehicle state, ambient environment information, user information, and so on. The sensor unit 3240*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 3240*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 3210 may receive map data, traffic information data, and so on, from an external server. The autonomous driving unit 3240*d* may generate an autonomous driving path and a driving plan from the obtained data. The control unit 3220 may control the driving unit 3240*a* such that the vehicle or the autonomous driving vehicle 3200 may move along the autonomous driving path according to the driving plan (e.g., speed/direction control). In the middle of autonomous driving, the communication unit 3210 may aperiodically/periodically acquire recent traffic information data from the external server and acquire surrounding traffic information data from neighboring vehicles. In the middle of autonomous driving, the sensor unit 3240*c* may obtain a vehicle state and/or surrounding environment information. The autonomous driving unit 3240*d* may update the autonomous driving path and the driving plan based on the newly obtained data/information. The communication unit 3210 may transfer information related to a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

An example of the present specification includes an example of FIG. 32, which will hereinafter be described in detail.

Figure 33:
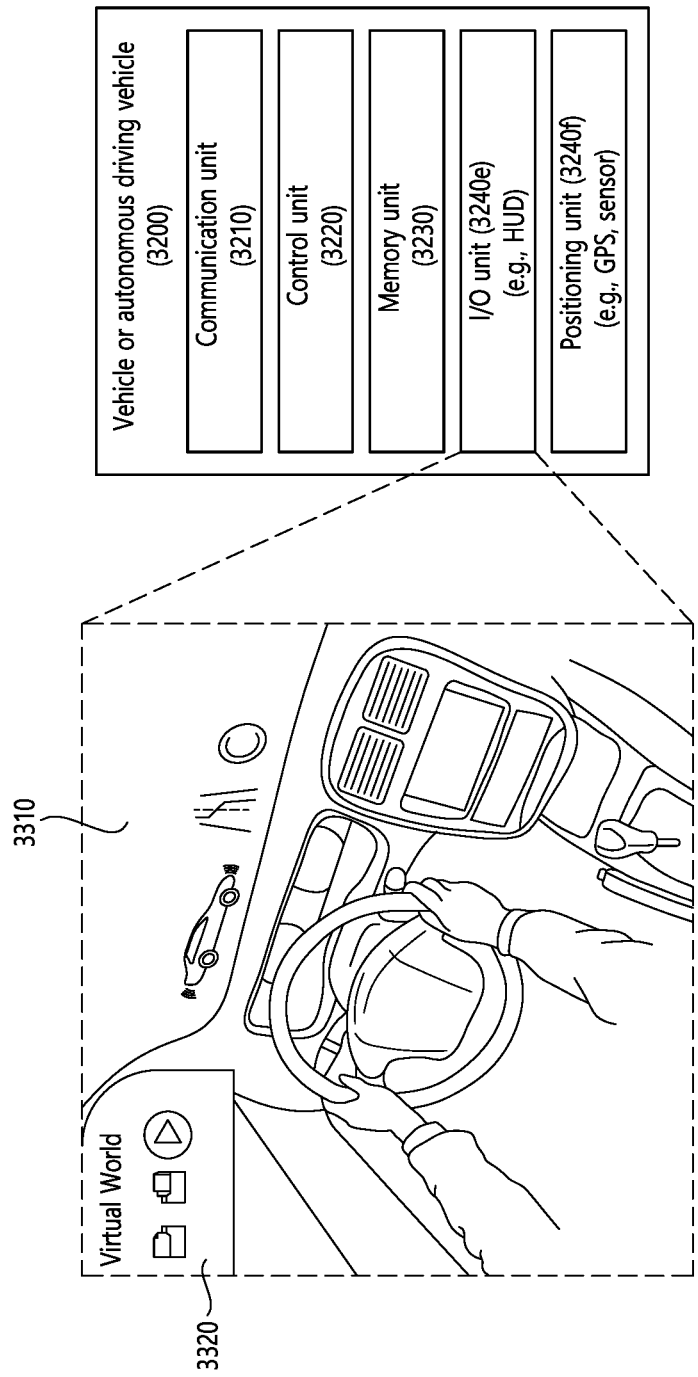
FIG. 33 shows an example of a vehicle that is applied to the present specification.

FIG. 33 shows an example of a vehicle that is applied to the present specification. The vehicle may be implemented as a transport means, an aerial vehicle, a ship, and so on.

Referring to FIG. 33, a vehicle 3200 may include a communication unit 3210, a control unit 3220, a memory unit 3230, an input/output (I/O) unit 3240*e*, and a positioning unit 3240*f*. Each block/unit/device shown in FIG. 32 may be the same as each block/unit/device shown in FIG. 32, respectively.

The communication unit 3210 may transmit and receive signals (e.g., data and control signals) to and from external devices such as other vehicles or BSs. The control unit 3220 may perform various operations by controlling constituent elements of the vehicle 3200. The memory unit 3230 may store data/parameters/programs/code/commands for supporting various functions of the vehicle 3200. The I/O unit 3240*e* may output an AR/VR object based on information within the memory unit 3230. The I/O unit 3240*e* may include a HUD. The positioning unit 3240*f* may acquire information related to the position of the vehicle 3200. The position information may include information related to an absolute position of the vehicle 3200, information related to the position of the vehicle 3200 within a traveling lane, acceleration information, and information related to the position of the vehicle 3200 from a neighboring vehicle. The positioning unit 3240*f* may include a GPS and various sensors.

As an example, the communication unit 3210 of the vehicle 3200 may receive map information and traffic information from an external server and store the received information in the memory unit 3230. The positioning unit 3240*f* may obtain the vehicle position information through the GPS and various sensors and store the obtained information in the memory unit 3230. The control unit 3220 may generate a virtual object based on the map information, traffic information, and vehicle position information and the I/O unit 3240*e* may display the generated virtual object in a window in the vehicle 3210, 3220. The control unit 3220 may determine whether the vehicle 3200 normally drives within a traveling lane, based on the vehicle position information. If the vehicle 3200 abnormally exits from the traveling lane, the control unit 3220 may display a warning on the window in the vehicle through the I/O unit 3240*e*. In addition, the control unit 3220 may broadcast a warning message regarding driving abnormity to neighboring vehicles through the communication unit 3210. According to situation, the control unit 3220 may transmit the vehicle position information and the information related to driving/vehicle abnormality to related organizations.

The foregoing technical features of this specification are applicable to various applications or business models.

For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

xR technology may be applied to a head-mount display (HMD), a head-up display (HUD), a mobile phone, a tablet PC, a laptop computer, a desktop computer, a TV, digital signage, and the like. A device to which xR technology is applied may be referred to as an xR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a station (STA) in a wireless local area network (WLAN) system, the method comprising:
    receiving a Next Generation V2X Physical Protocol Data Unit (NGV PPDU), wherein the NGV PPDU includes a legacy signal (L-SIG) field, a repeated L-SIG (RL-SIG) field being contiguous to the L-SIG field, an NGV signal (NGV-SIG) field being contiguous to the RL-SIG field, a repeated NGV signal (RNGV-SIG) field being contiguous to the NGV-SIG field, an NGV Long Training Field (NGV-LTF), a data field, and at least one midamble,
    wherein the RL-SIG field is a repeat of the L-SIG field, and the RNGV-SIG field is a repeat of the NGV-SIG field,
    wherein the NGV-SIG field includes a first field related to a Physical version, a second field related to a periodicity of the at least one midamble, and a third field related to a format of the NGV-LTF,
    wherein the NGV PPDU has a bandwidth of 10 MHz,
    wherein the third field is set to a first value based on the NGV-LTF being configured based on an NGV-LTF-1x sequence,
    wherein the third field is set to a second value based on the NGV-LTF being configured based on an NGV-LTF-2x sequence,
    wherein the NGV-LTF-1x sequence is defined as {1, 0, 1, 0, −1, 0, 1, 0, −1, 0, −1, 0, 1, 0, 1, 0, 1, 0, −1, 0, 1, 0, 1, 0, 1, 0, 1, 0, 0, 0, −1, 0, 1, 0, −1, 0, −1, 0, −1, 0, −1, 0, −1, 0, 1, 0, −1, 0, −1, 0, −1, 0, 1, 0, 1, 0, −1},
    wherein the NGV-LTF-2x sequence is defined as {1, 1, 1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, 1, 1, −1, −1, 1, −1, 1, −1, 1, 1, 1, 1, −1, −1},
    wherein a symbol related to the NGV-LTF-1x sequence includes a Guard Interval (GI) having a length of 1.6 µs, and a duration of the symbol related to the NGV-LTF-1x sequence has a length of 4.8 µs; and
    decoding the NGV PPDU based on the NGV-SIG field.

2. The method of claim 1, wherein the periodicity of the at least one midamble is set to one of 4, 8, and 16 symbols.

3. The method of claim 1, wherein the NGV PPDU is received through a 5.9 GHz band based on a frequency spacing of 156.25 kHz.

4. A method performed by a station (STA) in a wireless local area network (WLAN) system, the method comprising:
    generating a Next Generation V2X Physical Protocol Data Unit (NGV PPDU), wherein the NGV PPDU includes a legacy signal (L-SIG) field, a repeated L-SIG (RL-SIG) field being contiguous to the L-SIG field, an NGV signal (NGV-SIG) field being contiguous to the RL-SIG field, a repeated NGV signal (RNGV-SIG) field being contiguous to the NGV-SIG field, an NGV Long Training Field (NGV-LTF), a data field, and at least one midamble,
    wherein the RL-SIG field is a repeat of the L-SIG field, and the RNGV-SIG field is a repeat of the NGV-SIG field,
    wherein the NGV-SIG field includes a first field related to a Physical version, a second field related to a periodicity of the at least one midamble, and a third field related to a format of the NGV-LTF,
    wherein the NGV PPDU has a bandwidth of 10 MHz,
    wherein the third field is set to a first value based on the NGV-LTF being configured based on an NGV-LTF-1x sequence,
    wherein the third field is set to a second value based on the NGV-LTF being configured based on an NGV-LTF-2x sequence,
    wherein the NGV-LTF-1x sequence is defined as {1, 0, 1, 0, −1, 0, 1, 0, −1, 0, −1, 0, 1, 0, 1, 0, 1, 0, −1, 0, 1, 0, 1, 0, 1, 0, 1, 0, 0, 0, −1, 0, 1, 0, −1, 0, −1, 0, −1, 0, −1, 0, −1, 0, 1, 0, −1, 0, −1, 0, −1, 0, 1, 0, 1, 0, −1},
    wherein the NGV-LTF-2x sequence is defined as {1, 1, 1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, 1, 1, −1, −1, 1, −1, 1, −1, 1, 1, 1, 1, −1, −1},
    wherein a symbol related to the NGV-LTF-1x sequence includes a Guard Interval (GI) having a length of 1.6 µs, and a duration of the symbol related to the NGV-LTF-1x sequence has a length of 4.8 µs; and
    transmitting the NGV PPDU.

5. The method of claim 4, wherein the periodicity of the at least one midamble is set to one of 4, 8, and 16 symbols.

6. The method of claim 4, wherein the NGV PPDU is transmitting through a 5.9 GHz band based on a frequency spacing of 156.25 kHz.

7. A station (STA) in a wireless local area network (WLAN) system, comprising:
at least one processor; and
at least one computer memory operatively connected to the at least one processor and storing instructions that, based on being executed by the at least one processor, perform operations comprising:
receiving a Next Generation V2X Physical Protocol Data Unit (NGV PPDU), wherein the NGV PPDU includes a legacy signal (L-SIG) field, a repeated L-SIG (RL-SIG) field being contiguous to the L-SIG field, an NGV signal (NGV-SIG) field being contiguous to the RL-SIG field, a repeated NGV signal (RNGV-SIG) field being contiguous to the NGV-SIG field, an NGV Long Training Field (NGV-LTF), a data field, and at least one midamble,
wherein the RL-SIG field is a repeat of the L-SIG field, and the RNGV-SIG field is a repeat of the NGV-SIG field,
wherein the NGV-SIG field includes a first field related to a Physical version, a second field related to a periodicity of the at least one midamble, and a third field related to a format of the NGV-LTF,
wherein the NGV PPDU has a bandwidth of 10 MHz,
wherein the third field is set to a first value based on the NGV-LTF being configured based on an NGV-LTF-1x sequence,
wherein the third field is set to a second value based on the NGV-LTF being configured based on an NGV-LTF-2x sequence,
wherein the NGV-LTF-1x sequence is defined as {1, 0, 1, 0, −1, 0, 1, 0, −1, 0, −1, 0, 1, 0, 1, 0, 1, 0, −1, 0, 1, 0, 1, 0, 1, 0, 1, 0, 0, 0, −1, 0, 1, 0, −1, 0, −1, 0, −1, 0, −1, 0, −1, 0, 1, 0, −1, 0, −1, 0, −1, 0, 1, 0, 1, 0, −1},
wherein the NGV-LTF-2x sequence is defined as {1, 1, 1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1, −1, −1},
wherein a symbol related to the NGV-LTF-1x sequence includes a Guard Interval (GI) having a length of 1.6 μs, and a duration of the symbol related to the NGV-LTF-1x sequence has a length of 4.8 μs; and
decoding the NGV PPDU based on the NGV-SIG field.

8. The STA of claim 7, wherein the periodicity of the at least one midamble is set to one of 4, 8, and 16 symbols.

9. The STA of claim 7, wherein the NGV PPDU is transmitting through a 5.9 GHz band based on a frequency spacing of 156.25 kHz.

* * * * *